US012465441B2

(12) United States Patent
Zucker et al.

(10) Patent No.: US 12,465,441 B2
(45) Date of Patent: Nov. 11, 2025

(54) MULTI-ARM ROBOTIC SYSTEMS AND METHODS FOR IDENTIFYING A TARGET

(71) Applicant: Mazor Robotics Ltd., Caesarea (IL)

(72) Inventors: Ido Zucker, Tel Aviv (IL); Yizhaq Shmayahu, Ramat HaSharon (IL); Yonatan Ushpizin, Glil Yam (IL); Eliyahu Zehavi, Tel Aviv (IL); Dany Junio, Tel Aviv-Jaffa (IL)

(73) Assignee: Mazor Robotics Ltd., Caesarea (IL)

( * ) Notice: Subject to any disclaimer, the term of this patent is extended or adjusted under 35 U.S.C. 154(b) by 493 days.

(21) Appl. No.: 17/575,404

(22) Filed: Jan. 13, 2022

(65) Prior Publication Data
US 2022/0241032 A1    Aug. 4, 2022

Related U.S. Application Data

(60) Provisional application No. 63/144,073, filed on Feb. 1, 2021.

(51) Int. Cl.
*A61B 34/30* (2016.01)
*A61B 34/10* (2016.01)
*A61B 34/20* (2016.01)

(52) U.S. Cl.
CPC .............. *A61B 34/30* (2016.02); *A61B 34/10* (2016.02); *A61B 34/20* (2016.02); *A61B 2034/107* (2016.02); *A61B 2034/2055* (2016.02)

(58) Field of Classification Search
CPC ......... A61B 34/10; A61B 34/20; A61B 34/30; A61B 2034/107; A61B 2034/2055
See application file for complete search history.

(56) References Cited

U.S. PATENT DOCUMENTS

| 5,329,933 A | 7/1994 | Graf |
| 6,152,890 A | 11/2000 | Kupfer et al. |

(Continued)

FOREIGN PATENT DOCUMENTS

| CA | 2958013 | 4/2017 |
| CN | 108186120 | 6/2018 |

(Continued)

OTHER PUBLICATIONS

Gang Li, et al., "Robotic System for MRI-Guided Sterotactic Neurosurgery." IEEE Trans Biomed Eng. Apr. 2015 ; 62(4): 1077-1088. doi:10.1109/TBME.2014.2367233. (Year: 2015).*

(Continued)

*Primary Examiner* — Tan-Uyen T Ho
*Assistant Examiner* — Cherie M Poland
(74) *Attorney, Agent, or Firm* — Sheridan Ross P.C.

(57) ABSTRACT

Systems and methods for tracking a pose of a target and/or tracking the target is provided. A first robotic arm may be configured to orient a first imaging device and a second robotic arm may be configured to orient a second imaging device. The first robotic arm and the second robotic arm may operate in a shared or common coordinate space. A first image may be received from the first imaging device and a second image may be received from the second imaging device. The first image and the second image may depict at least one target. A pose of the at least one target may be determined in the coordinate space based on the first image, a corresponding first pose, the second image, and a corresponding second pose.

20 Claims, 7 Drawing Sheets

(56) References Cited

U.S. PATENT DOCUMENTS

| | | |
|---|---|---|
| 6,200,024 B1 | 3/2001 | Negralli |
| 6,435,715 B1 | 8/2002 | Betz et al. |
| 6,582,121 B2 | 6/2003 | Crain et al. |
| 6,644,852 B2 | 11/2003 | Crain et al. |
| 7,198,630 B2 | 4/2007 | Lipow |
| 7,567,834 B2 | 7/2009 | Clayton et al. |
| 7,708,741 B1 | 5/2010 | Bonutti |
| 7,899,226 B2 | 3/2011 | Pescatore et al. |
| 7,907,166 B2 | 3/2011 | Lamprecht et al. |
| 8,073,528 B2 | 12/2011 | Zhao et al. |
| 8,108,072 B2 | 1/2012 | Zhao et al. |
| 8,147,503 B2 | 4/2012 | Zhao et al. |
| 8,392,022 B2 | 3/2013 | Ortmaier et al. |
| 8,568,317 B1 | 10/2013 | Gharib et al. |
| 8,611,495 B2 | 12/2013 | Maschke |
| 8,721,566 B2 | 5/2014 | Connor et al. |
| 8,781,630 B2 | 7/2014 | Banks et al. |
| 8,870,889 B2 | 10/2014 | Frey |
| 9,050,728 B2 | 6/2015 | Ban et al. |
| 9,259,276 B2 | 2/2016 | Mintz et al. |
| 9,259,278 B2 | 2/2016 | Jensen |
| 9,259,282 B2 | 2/2016 | Azizian et al. |
| 9,307,894 B2 | 4/2016 | von Grunberg et al. |
| 9,402,689 B2 | 8/2016 | Prisco et al. |
| 9,492,927 B2 * | 11/2016 | Diolaiti .................. B25J 13/025 |
| 9,592,096 B2 | 3/2017 | Maillet et al. |
| 9,649,072 B2 | 5/2017 | Ragnarsdottir et al. |
| 9,662,174 B2 | 5/2017 | Taylor et al. |
| 9,687,301 B2 | 6/2017 | Lee et al. |
| 9,767,608 B2 | 9/2017 | Lee et al. |
| 9,789,313 B2 | 10/2017 | Lipani |
| 9,888,966 B2 | 2/2018 | Farritor et al. |
| 9,895,813 B2 | 2/2018 | Blumenkranz et al. |
| 9,969,090 B2 | 5/2018 | Warashina et al. |
| 10,076,385 B2 | 9/2018 | Shoham et al. |
| 10,149,729 B2 | 12/2018 | Smaby et al. |
| 10,271,832 B2 | 4/2019 | O'Neil et al. |
| 10,299,880 B2 | 5/2019 | Ramirez Luna et al. |
| 10,368,054 B2 | 7/2019 | Panescu et al. |
| 10,383,765 B2 | 8/2019 | Alvarez et al. |
| 10,390,895 B2 | 8/2019 | Henderson et al. |
| 10,456,076 B2 | 10/2019 | Liu |
| 10,456,211 B2 | 10/2019 | McAfee |
| 10,512,413 B2 | 12/2019 | Schepis et al. |
| 10,561,384 B2 | 2/2020 | Tanaka et al. |
| 10,668,625 B2 | 6/2020 | Kuroda et al. |
| 10,675,098 B2 | 6/2020 | Zhao et al. |
| 10,675,107 B2 | 6/2020 | Steger et al. |
| 10,812,778 B1 * | 10/2020 | Wang ................. G01B 11/0608 |
| 11,298,195 B2 | 4/2022 | Ye et al. |
| 11,553,969 B1 * | 1/2023 | Lang .................. G02B 27/0172 |
| 12,161,428 B1 * | 12/2024 | Lang .................. G06T 7/0012 |
| 2004/0122427 A1 | 6/2004 | Holmes |
| 2005/0096502 A1 | 5/2005 | Khalili |
| 2006/0241414 A1 | 10/2006 | Nowlin et al. |
| 2006/0258938 A1 * | 11/2006 | Hoffman .................. A61B 5/06 |
| | | 600/424 |
| 2007/0001638 A1 | 1/2007 | Gray et al. |
| 2007/0106307 A1 | 5/2007 | Bodduluri et al. |
| 2007/0232958 A1 | 10/2007 | Donofrio et al. |
| 2011/0069818 A1 | 3/2011 | Muller |
| 2011/0087238 A1 | 4/2011 | Wang et al. |
| 2011/0106102 A1 | 5/2011 | Balicki et al. |
| 2011/0172566 A1 | 7/2011 | Kawchuk |
| 2011/0172720 A1 | 7/2011 | Metcalf, Jr. et al. |
| 2011/0276179 A1 * | 11/2011 | Banks .................. A61B 34/76 |
| | | 700/264 |
| 2012/0029694 A1 | 2/2012 | Mueller |
| 2012/0041562 A1 | 2/2012 | Shachar et al. |
| 2012/0059391 A1 * | 3/2012 | Diolaiti .................. B25J 9/1689 |
| | | 606/130 |
| 2013/0012831 A1 | 1/2013 | Schmitz et al. |
| 2013/0096574 A1 | 4/2013 | Kang et al. |
| 2013/0211419 A1 * | 8/2013 | Jensen .................. A61B 6/4441 |
| | | 606/130 |
| 2013/0268007 A1 | 10/2013 | Rezach et al. |
| 2014/0163736 A1 | 6/2014 | Azizian et al. |
| 2014/0179997 A1 | 6/2014 | von Grunberg et al. |
| 2014/0188132 A1 | 7/2014 | Kang |
| 2014/0253684 A1 | 9/2014 | Kumar et al. |
| 2014/0309659 A1 | 10/2014 | Roh et al. |
| 2015/0297177 A1 | 10/2015 | Boctor et al. |
| 2016/0081754 A1 * | 3/2016 | Kostrzewski .......... A61B 34/70 |
| | | 606/130 |
| 2016/0184032 A1 | 6/2016 | Romo et al. |
| 2017/0273614 A1 | 9/2017 | Giphart et al. |
| 2018/0064497 A1 | 3/2018 | Hussain et al. |
| 2018/0193101 A1 | 7/2018 | Hashimoto |
| 2018/0263530 A1 | 9/2018 | Jung |
| 2018/0307314 A1 | 10/2018 | Connor |
| 2018/0333061 A1 | 11/2018 | Pracyk et al. |
| 2018/0368931 A1 | 12/2018 | Hongo et al. |
| 2019/0069957 A1 | 3/2019 | Barral et al. |
| 2019/0125460 A1 | 5/2019 | Maillet et al. |
| 2019/0206565 A1 | 7/2019 | Shelton, IV |
| 2019/0307519 A1 | 10/2019 | Popovic |
| 2019/0357884 A1 | 11/2019 | Williams et al. |
| 2019/0374299 A1 | 12/2019 | Peine |
| 2020/0015806 A1 | 1/2020 | Scheib et al. |
| 2020/0015923 A1 | 1/2020 | Scheib et al. |
| 2020/0054215 A1 | 2/2020 | Roche |
| 2020/0060775 A1 | 2/2020 | Bonutti |
| 2020/0069377 A1 | 3/2020 | Finley et al. |
| 2020/0113637 A1 | 4/2020 | Ida et al. |
| 2020/0169673 A1 * | 5/2020 | King ..................... G16H 40/63 |
| 2020/0179065 A1 | 6/2020 | Crawford et al. |
| 2020/0205900 A1 | 7/2020 | Buckland et al. |
| 2020/0261160 A1 | 8/2020 | Peine et al. |
| 2020/0261297 A1 * | 8/2020 | Strydom ............ A61G 13/0081 |
| 2020/0360099 A1 | 11/2020 | Smaby et al. |
| 2020/0405403 A1 | 12/2020 | Shelton, IV et al. |
| 2021/0029307 A1 | 1/2021 | King et al. |
| 2021/0219997 A1 | 7/2021 | Tyndall et al. |
| 2021/0298590 A1 | 9/2021 | Ayvali et al. |
| 2021/0338348 A1 | 11/2021 | Zahavi et al. |
| 2021/0402603 A1 | 12/2021 | Murphy et al. |
| 2022/0096188 A1 | 3/2022 | Ellman et al. |
| 2022/0160445 A1 | 5/2022 | Meglan et al. |
| 2022/0241026 A1 | 8/2022 | Shoham et al. |
| 2022/0395342 A1 * | 12/2022 | Weiss .................. A61B 6/4458 |

FOREIGN PATENT DOCUMENTS

| | | |
|---|---|---|
| CN | 109171745 | 1/2019 |
| DE | 10042599 | 3/2002 |
| DE | 102012004506 | 9/2013 |
| DE | 102015217059 | 3/2017 |
| EP | 2289452 | 3/2011 |
| EP | 2757948 | 7/2014 |
| EP | 2467074 | 1/2019 |
| EP | 3492046 | 6/2019 |
| EP | 3492047 | 6/2019 |
| EP | 2739231 | 9/2019 |
| EP | 3551983 | 10/2019 |
| EP | 3060157 | 12/2019 |
| EP | 3609422 | 2/2020 |
| EP | 2879608 | 3/2020 |
| GB | 2156983 | 10/1985 |
| JP | 5207490 | 6/2013 |
| JP | 2017-512299 | 5/2017 |
| JP | 2019-524230 | 9/2019 |
| KR | 10-2019-114052 | 10/2019 |
| RO | 132416 | 3/2018 |
| WO | WO 95/01757 | 1/1995 |
| WO | WO 96/29930 | 10/1996 |
| WO | WO 00/35366 | 6/2000 |
| WO | WO 2007/025218 | 3/2007 |
| WO | WO 2007/038510 | 4/2007 |
| WO | WO 2010/068005 | 6/2010 |
| WO | WO 2011/149845 | 12/2011 |
| WO | WO 2012/168534 | 12/2012 |
| WO | WO 2014/106262 | 7/2014 |
| WO | WO 2017/002143 | 1/2017 |
| WO | WO 2018/203903 | 11/2018 |

(56) References Cited

FOREIGN PATENT DOCUMENTS

| WO | WO 2019/036006 | 2/2019 |
|---|---|---|
| WO | WO 2019/206340 | 10/2019 |
| WO | WO 2020/072255 | 4/2020 |
| WO | WO 2020/079596 | 4/2020 |
| WO | WO 2020/118244 | 6/2020 |
| WO | WO 2020/201353 | 10/2020 |

OTHER PUBLICATIONS

Invitation to Pay Additional Fees for International (PCT) Patent Application No. PCT/IL2022/050603, dated Oct. 6, 2022, 13 pages.
International Search Report and Written Opinion for International (PCT) Patent Application No. PCT/IL2022/050603, dated Nov. 28, 2022, 21 pages.
International Search Report and Written Opinion for International (PCT) Patent Application No. PCT/IB2021/058420, dated Nov. 29, 2021 16 pages.
International Search Report and Written Opinion prepared by the Israel Patent Office on Dec. 31, 2019, for International Application No. PCT/IB2019/058795.
"Robotic Assisted Systems," Intuitive Surgical, Jul. 2019, 5 pages.
"Robot-Assisted Laparoscopic Procedures," EBESCO Information Services, Updated May 2014, 6 pages [retrieved online from: www.wkhs.com/cancer/cancer-treatment-services/surgery/robotic-surgery/robot-assisted-laparoscopic-procedures].
Abdelaal et al. "A multi-camera, multi-view system for training and skill assessment for robot-assisted surgery," International Journal of Computer Assisted Radiology and Surgery, May 2020, vol. 15, pp. 1369-1377.
Boctor et al. "A Dual-Armed Robotic System for Intraoperative Ultrasound Guided Hepatic Ablative Therapy: A Prospective Study," IEEE, Proceedings of the 2004 IEEE International Conference on Robotics & Automation, New Orleans, LA, Apr. 2004, pp. 2517-2522.
Cao et al. "A Novel Robotic Suturing System for Flexible Endoscopic Surgery," IEEE, 2019 International Conference on Robotics and Automation (ICRA), May 20-24, 2019, Montreal, Canada, 7 pages.
He et al. "A Multi-Function Force Sensing Instrument for Variable Admittance Robot Control in Retinal Microsurgery," 2014 IEEE International Conference on Robotics and Automation (ICRA), 2014, pp. 1411-1418.
Joskowicz "Computer-aided surgery meets predictive, preventive, and personalized medicine," EPMA Journal, 2017, vol. 8, 4 pages.
Khandalavala "Emerging surgical robotic technology: a progression toward microbots," Annals of Laparoscopic and Endoscopic Surgery, Jan. 2020, vol. 5, Article 3, 18 pages.
Kim et al. "Robot-Assisted Cardiac Surgery Using the Da Vinci Surgical System: A Single Center Experience," Korean Journal of Thoracic and Cardiovascular Surgery, 2015, vol. 48, pp. 99-104.
Kong et al. "Da Vinci Tool Torque Mapping over 50,000 Grasps and its Implications on Grip Force Estimation Accuracy," 2018 International Symposium on Medical Robotics (ISMR), 2018, 6 pages.
Kumar et al. "Emerging role of robotics in urology, Journal of Minimal Access Surgery," Oct. 2005, vol. 1, No. 4, pp. 202-210.
Li et al. "Design of a Multi-Arm Surgical Robotic System for Dexterous Manipulation," Journal of Mechanisms and Robotics, Dec. 2016, vol. 8, article 061017, 10 pages.
Matthews "How better data, 5G, and surgical robots will improve healthcare," The Robot Report, Sep. 29, 2019, 12 pages [retrieved online from: www.therobotreport.com/better-data-advancing-healthcare-robotics].
Seibold "An Advanced Force Feedback Tool Design for Minimally Invasive Robotic Surgery," Technische Universität München, May 15, 2012, Doctoral Engineers dissertation, 218 pages.
Staub "Micro Endoscope based Fine Manipulation in Robotic Surgery," Technische Universitat Munchen Lehrstuhl Robotic und Echtzeitsysteme, Dissertation, Apr. 2013, 146 pages.

Tian et al. "A Robot-Assisted Surgical System Using a Force-Image Control Method for Pedicle Screw Insertion," PLOS One, Jan. 2014, vol. 9, No. 1, article e86346, 9 pages.
Valeo "Scarless Surgery: The benefits and drawbacks of robotic thryroidectomy," ENTtoday, Apr. 1, 2010, 4 pages [retrieved online from: www.enttoday.org/article/scarless-surgery-the-benefits-and-drawbacks-of-robotic-thryroidectomy/].
Vivek et al. "Study of Neuroarm and Force Sensing Grippers in Robo-Assisted Neurosurgery," International Journal of Current Engineering and Technology, Mar. 2016, Special Issue 4, pp. 444-447.
Invitation to Pay Additional Fees for International (PCT) Patent Application No. PCT/IL2022/050126, dated May 27, 2022, 11 pages.
International Search Report and Written Opinion for International (PCT) Patent Application No. PCT/IL2022/050126, dated Jul. 18, 2022, 18 pages.
Extended Search Report for European Patent Application No. 19872498.1, dated Jun. 9, 2022, 9 pages.
International Preliminary Report on Patentability for International (PCT) Patent Application No. PCT/IB2021/058420, dated Apr. 13, 2023 10 pages.
Official Action with English Translation for Japan Patent Application No. 2021-514567, dated May 11, 2023, 12 pages.
Official Action with English Translation for Japan Patent Application No. 2021-514567, dated Sep. 26, 2023, 12 pages.
Official Action for U.S. Appl. No. 17/344,658, dated Aug. 4, 2023 6 pages Restriction Requirement.
Official Action for U.S. Appl. No. 17/344,658, dated Oct. 25, 2023 9 pages.
Official Action for U.S. Appl. No. 17/285,374, dated Aug. 30, 2023 14 pages.
Official Action with Machine Translation for China Patent Application No. 201980067844.9, dated Mar. 1, 2024, 27 pages.
Official Action for U.S. Appl. No. 17/344,658, dated Mar. 21, 2024 12 pages.
Official Action for U.S. Appl. No. 17/285,374, dated Feb. 6, 2024 16 pages.
Official Action for U.S. Appl. No. 17/285,374, dated May 8, 2024 15 pages.
Official Action for U.S. Appl. No. 17/344,658, dated Jul. 15, 2024 10 pages.
Aranda-Valera et al. "Measuring Spinal Mobility Using an Inertial Measurement Unit System: A Validation Study in Axial Spondyloarthritis," Diagnostics, 2020, vol. 10, No. 6, Article 426, 13 pages.
Dai et al. "Vibration-Based Milling Condition Monitoring in Robot-Assisted Spine Surgery," IEEE/AMSE Transactions on Mechatronics, Dec. 2015, vol. 20, No. 6, pp. 3028-3039.
Haratian et al. "Toward Flexibility in Sensor Placement for Motion Capture Systems: A Signal Processing Approach," IEEE Sensors Journal, Mar. 2014, vol. 14, No. 3, pp. 701-709.
Hennersperger et al. "Towards MRI-Based Autonomous Robotic US Acquisitions: A First Feasibility Study," IEEE Transactions on Medical Imaging, Feb. 2017, vol. 36, No. 2, pp. 538-548.
Leroy "Analysis of the spine through a multibody model and IMU technology," Ecole polytechnique de Louvain, Université catholique de Louvain, 2019, 90 pages [retrieved online Oct. 29, 2020 from: hdl.handle.net/2078.1/thesis:19491].
Stolka et al. "Improving Navication Precision of Milling Operations in Surgical Robotics," Proceedings of the 2006 IEEE/RSJ International Conference on Intelligent Robotics and Systems, Oct. 9-15, 2008, Beijing, China, pp. 2351-2357.
Vandini et al. "Unified Tracking and Shape Estimation for Concentric Tube Robots," IEEE Transactions on Robotics, Aug. 2017, vol. 33, No. 4, pp. 901-915.
Voinea et al. "Measurement and Geometric Modelling of Human Spine Posture for Medical Rehabilitation Purposes Using a Wearable Monitoring System Based on Inertial Sensors," Sensors, 2017, vol. 17, No. 1, Article 3, 19 pages.
International Search Report and Written Opinion for International (PCT) Patent Application No. PCT/IL2022/050141, dated Jun. 8, 2022, 16 pages.

(56) References Cited

OTHER PUBLICATIONS

Official Action for U.S. Appl. No. 17/464,300, dated Aug. 20, 2024 31 pages.
Official Action for U.S. Appl. No. 17/583,788, dated Aug. 19, 2024 6 pages Restriction Requirement.
Official Action with English Translation for Japan Patent Application No. 2024-009920, dated Jan. 15, 2025, 6 pages.
Notice of Allowance for U.S. Appl. No. 17/464,300, dated Nov. 20, 2024 10 pages.
Official Action for U.S. Appl. No. 17/583,788, dated Jan. 16, 2025 13 pages.
Official Action for U.S. Appl. No. 17/344,658, dated Dec. 16, 2024 15 pages.
Notice of Allowance for U.S. Appl. No. 17/285,374, dated Oct. 30, 2024 8 pages.

* cited by examiner

MULTI-ARM ROBOTIC SYSTEMS AND METHODS FOR IDENTIFYING A TARGET

CROSS REFERENCE TO RELATED APPLICATIONS

This application claims the benefit of U.S. Provisional Application No. 63/144,073, filed on Feb. 1, 2021, and entitled "Multi-arm Robotic Systems and Methods for Identifying a Target", which application is incorporated herein by reference in its entirety.

FIELD

The present technology is related generally to identifying a target, and more particularly, to identifying a position of a target and/or tracking the target using a multi-arm robotic system.

BACKGROUND

Surgical robots may be used to hold one or more tools or devices during a surgery, and may operate autonomously (e.g., without any human input during operation), semi-autonomously (e.g., with some human input during operation), or non-autonomously (e.g., only as directed by human input).

SUMMARY

Example aspects of the present disclosure include:

A system for tracking a pose of a target according to at least one embodiment of the present disclosure comprises a first robotic arm configured to orient a first imaging device; a second robotic arm configured to orient a second imaging device, wherein the first robotic arm and the second robotic arm operate in a shared coordinate space; at least one processor; and at least one memory storing instructions for execution by the at least one processor that, when executed, cause the at least one processor to: receive a first image from the first imaging device, the first image depicting at least one target; receive a second image from the second imaging device, the second image depicting the at least one target; receive first pose information corresponding to a first pose of the first imaging device in the coordinate space and second pose information corresponding to a second pose of the second imaging device in the coordinate space; and determine a pose of the at least one target in the coordinate space based on the first image, the first pose, the second image, and the second pose.

Any of the aspects herein, wherein the memory stores additional instructions for execution by the at least one processor that, when executed, further cause the at least one processor to: calculate a three-dimensional volume of the at least one target based on the first image, the second image, the first pose, and the second pose.

Any of the aspects herein, wherein the first robotic arm is configured to orient a tool in addition to the first imaging device.

Any of the aspects herein, wherein the at least one target is an incision, and wherein the memory stores additional instructions for execution by the at least one processor that, when executed, further cause the at least one processor to: cause the second imaging device to track the incision formed on a patient.

Any of the aspects herein, wherein the first robotic arm is configured to orient a tool, and wherein the memory stores additional instructions for execution by the at least one processor that, when executed, further cause the at least one processor to: update a path of the first robotic arm when the second imaging device detects movement of the incision.

Any of the aspects herein, wherein the memory stores additional instructions for execution by the at least one processor that, when executed, further cause the at least one processor to: cause the second imaging device to obtain a three-dimensional scan of the at least one target. Any of the aspects herein, wherein causing the second imaging device to obtain the three-dimensional scan includes calculating a plurality of poses to obtain the three-dimensional scan and causing the second robotic arm to orient the second imaging device at each pose of the plurality of poses.

Any of the aspects herein, wherein the second imaging device comprises a pair of stereoscopic cameras configured to generate three-dimensional images.

Any of the aspects herein, wherein the memory stores additional instructions for execution by the at least one processor that, when executed, further cause the at least one processor to: calculate a first set of poses for the first imaging device and a second set of poses for the second imaging device, cause the first robotic arm to orient the first imaging device at each of the first set of poses to yield a first set of images and the second robotic arm to orient the second imaging device at each of the second set of poses to yield a second set of images, each of the first set of images and the second set of images depicting the at least one target, and update the pose determination of the at least one target based on the first set of images, the first set of poses, the second set of images, and the second set of poses.

Any of the aspects herein, wherein the memory stores additional instructions for execution by the at least one processor that, when executed, further cause the at least one processor to: receive a pose image from the first imaging device, the pose image depicting the second robotic arm, receive pose information corresponding to a pose of the first imaging device when the pose image was obtained, and determine a pose of the second robotic arm in the coordinate space, based on the pose image and the pose information.

A system for determining a pose of a robotic arm according to at least one embodiment of the present disclosure comprises a first robotic arm; a first imaging device secured to the first robotic arm; a reference marker disposed on the first robotic arm; a second robotic arm, wherein the first robotic arm and the second robotic arm operate in a common coordinate space; a second imaging device secured to the second robotic arm; at least one processor; and at least one memory storing instructions for execution by the at least one processor that, when executed, cause the at least one processor to: receive a first image from the first imaging device, the first image depicting the reference marker, receive a second image from the second imaging device, the second image depicting the first robotic arm, receive first pose information corresponding to a first pose of the first imaging device and second pose information corresponding to a second pose of the second imaging device, and determine a pose of the second robotic arm based on the first image, the first pose, the second image, and the second pose.

Any of the aspects herein, wherein the at least one memory stores additional instructions for execution by the at least one processor that, when executed, further cause the at least one processor to: control the first robotic arm and the second robotic arm in the common coordinate space to avoid a collision between the first robotic arm and the second robotic arm.

Any of the aspects herein, wherein the memory stores additional instructions for execution by the at least one processor that, when executed, further cause the at least one processor to: cause the second imaging device to obtain a three-dimensional scan of the at least one target.

Any of the aspects herein, wherein the first robotic arm is configured to orient a tool.

Any of the aspects herein, wherein the memory stores additional instructions for execution by the at least one processor that, when executed, further cause the at least one processor to: generate a three-dimensional image of the at least one target using the first set of images and the second set of images.

A system for tracking a target according to at least one embodiment of the present disclosure comprises a first robotic arm configured to support and operate a tool; a second robotic arm, wherein the first robotic arm and the second robotic arm are configured to operate in the same coordinate space; an imaging device secured to the second robotic arm; at least one processor; and at least one memory storing instructions for execution by the at least one processor that, when executed, cause the at least one processor to: cause the imaging device to identify movement of a target, cause the first robotic arm to orient the tool along a tool path, and update the tool path when the imaging device identifies movement of the target.

Any of the aspects herein, wherein the memory stores additional instructions for execution by the at least one processor that, when executed, further cause the at least one processor to: receive at least one image from the imaging device, the at least one image depicting the target, receive pose information corresponding to at least one pose of the imaging device, and determine a pose of the target based on the at least one image and the pose information.

Any of the aspects herein, wherein the memory stores additional instructions for execution by the at least one processor that, when executed, further cause the at least one processor to: receive a plurality of images from the imaging device, the plurality of images depicting the target, receive pose information corresponding to a plurality of poses of the imaging device, each of the plurality of poses corresponding to one of the plurality of images, and determine a pose of the target based on the plurality of images and the pose information.

Any of the aspects herein, wherein the imaging device is a second imaging device and the system further comprises: a first imaging device secured to the first robotic arm.

Any of the aspects herein, wherein the memory stores additional instructions for execution by the at least one processor that, when executed, further cause the at least one processor to: receive at least one first image from the first imaging device and at least one second image from the second imaging device, receive first pose information corresponding to at least one first pose of the first imaging device and second pose information corresponding to at least one second pose of the second imaging device, and determine a pose of the target based on the at least one first image, the at least one first pose, the at least one second image, and the at least one second pose.

Any of the aspects herein, wherein the memory stores additional instructions for execution by the at least one processor that, when executed, further cause the at least one processor to: receive a surgical plan comprising information corresponding to a pose of a target.

Any of the aspects herein, wherein the memory stores additional instructions for execution by the at least one processor that, when executed, further cause the at least one processor to: cause the imaging device to obtain a three-dimensional scan of the target.

Any of the aspects herein, The system of claim 16, wherein the imaging device is at least one of an ultrasound device or an X-ray device configured to image the target when the target is internal to a patient.

Any of the aspects herein, where the imaging device is at least one of an optical camera or an infrared camera configured to image the target when the target is external to a patient.

Any of the aspects herein, wherein the target is at least one of an incision port, an incision, a pin, a screw, or a reference marker.

Any of the aspects herein, wherein the memory stores additional instructions for execution by the at least one processor that, when executed, further cause the at least one processor to: cause the second robotic arm to reorient the imaging device to keep the target in a field of view of the imaging device.

A system for tracking a target according to at least one embodiment of the present disclosure comprises a first robotic arm configured to support and operate a tool; a second robotic arm, wherein the first robotic arm and the second robotic arm are controllable in a common coordinate space; an imaging device secured to the second robotic arm; at least one processor; and at least one memory storing instructions for execution by the at least one processor that, when executed, cause the at least one processor to: receive a surgical plan having information about an initial pose of the target, receive at least one image from the imaging device, the at least one image depicting the target, receive pose information corresponding to at least one pose of the imaging device, and update the initial pose of the target based on the at least one image and the at least one pose to yield an updated pose of the target.

Any of the aspects herein, herein the memory stores additional instructions for execution by the at least one processor that, when executed, further cause the at least one processor to: determine a boundary of the target based on the at least one image and the at least one pose.

Any of the aspects herein, wherein the memory stores additional instructions for execution by the at least one processor that, when executed, further cause the at least one processor to: cause the imaging device to identify movement of the target, cause the first robotic arm to move the tool along a path, and update the path when the imaging device identifies movement of the target.

Any of the aspects herein, wherein the at least one memory stores additional instructions for execution by the at least one processor that, when executed, further cause the at least one processor to: control the first robotic arm to avoid the target.

Any of the aspects herein, wherein the imaging device comprises a pair of stereoscopic cameras configured to generate three-dimensional images.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_O$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_O$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
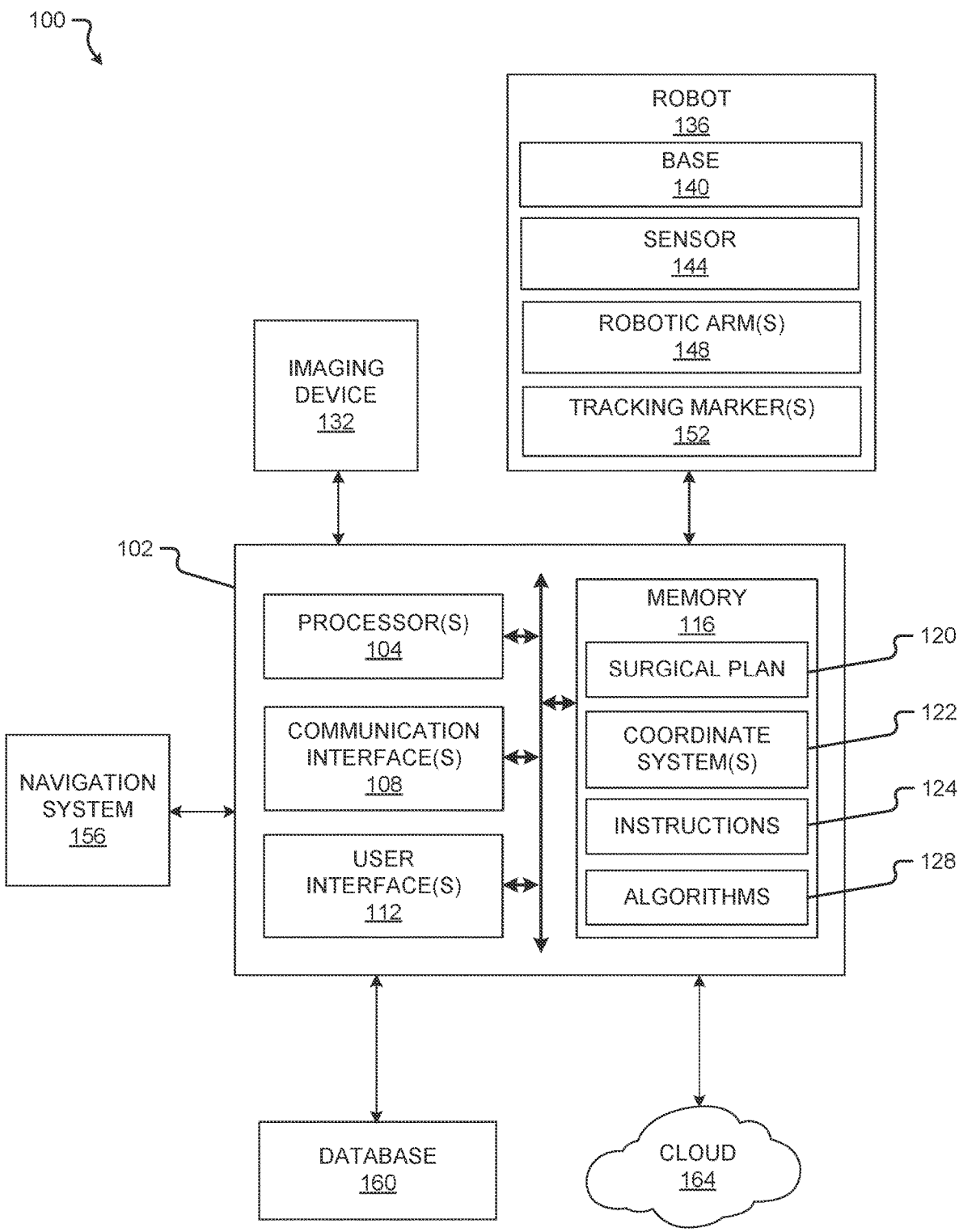
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

In robotic or navigated surgery, accuracy of supporting systems such as a navigation system and/or a robotic system may affect the success of a surgical operation or surgical procedure. In a surgical procedure using a navigation system, the navigation system may maintain accuracy of a position of one or more components by maintaining a line of sight with one or more reference markers. In a surgical procedure using a robotic system, the robotic system may perform one or more actions on patient tissue, which may move (due to the force applied onto the tissue) during execution of the one or more actions. Thus, there is a need to track and correct any identified movement.

Embodiments of the present disclosure provide for a robotic system that contains two or more robotic arms. Each robotic arm may be mounted with a camera or otherwise support a camera. The two or more robotic arms may be used in tandem to position tool(s) and/or identify target(s). A position of each camera is known (because the cameras are mounted on the robotic arm and a position of each robotic arm is known) and the combination of both known camera positions may provide for increased accuracy in positioning the tool(s) and/or identifying the target(s). In some embodiments the combination of two images (whether from each camera or from a single camera) may be used to calculate a three-dimensional volume of an identified target. In some embodiments, one or both of the robotic arms may perform a scanning motion with a camera around a specific area to obtain more view angles or perspectives of a target. The images obtained during such scanning may improve an accuracy of one or more identified tool and/or target positions. In some embodiments, a robotic arm may automatically change its position "around" a target to obtain more angles and improve an accuracy of an identified target position.

In some embodiments, a robotic arm may support a tool and perform an action with the tool and one or more different robotic arms may track the action with one or more cameras. In some embodiments, the robotic arm may use a camera to track a reference marker or a marking on a patient anatomy. In some embodiments, the robotic arm-mounted camera may scan the reference marker or the marking from more than one direction to improve an accuracy of an identified position of the reference marker or the marking. In some embodiments, the robotic arm may leave or insert a marker into a patient anatomy, which may then be used to track changes in a position of the patient anatomy. In such embodiments, a camera mounted to or otherwise supported by the same robotic arm that left or inserted the marker, or a camera mounted to or otherwise supported by a different robotic arm may track the marker.

In some embodiments, the robotic arm may make an incision or perform any other action on a patient anatomy and then track a position of the incision or the result of the action. For example, a robotic arm may support a tool and use the tool to make an incision on a patient's skin and/or penetrate into a patient's anatomy with the tool, then extract or remove the tool. The same and/or a different robotic arm may identify and recognize a position of the incision using one or more cameras, and the same or a different tool may then be guided to the incision or other port and inserted therein based on the position of the incision or other port as identified using the camera(s). In some embodiments, the incision will be marked by a ring or a port that will keep the incision open and facilitate easy recognition thereof.

In some embodiments, a robotic arm (or more than one robotic arm) may be used to recognize or identify a position and configuration (e.g., orientation) of a different robotic arm. The identified position and configuration may be used to accurately locate and/or place the different robotic arm in space. In some embodiments a robotic arm will recognize a position of tool(s) supported by a different robotic arm and correct a positioning of the different robotic arm.

Embodiments of the present disclosure provide technical solutions to the problems of (1) determining a pose, a position, or an orientation of a target; (2) tracking movement of a target; (3) adjusting a path of a tool, an instrument, or an implant based on tracked movement of a target; (4) increasing an accuracy of a pose, a position, or an orientation of a target (whether a tool, an instrument, an implant, a robotic arm, or any other object); and/or (5) increasing patient safety during robot-assisted or robotic surgeries.

Turning first to FIG. 1, a block diagram of a system 100 according to at least one embodiment of the present disclosure is shown. The system 100 may be used, for example: to determine a pose of a target; identify movement of a target; adjust a tool path based on the identified movement; determine a pose of a robotic arm; control a first robotic arm and a second robotic arm in a common coordinate space; to carry out one or more aspects of one or more of the methods disclosed herein; for navigation purposes; to carry out a fully autonomous and/or a robot-assisted surgery using a plurality of robots; or for any other useful purpose.

The system 100 comprises a computing device 102, an imaging device 132, a robot 136, a navigation system 156, a database 160, and a cloud 164. Notwithstanding the foregoing, systems according to other embodiments of the present disclosure may omit any one or more of the computing device 102, the navigation system 156, the database 160, and/or the cloud 164. Additionally, systems according to other embodiments of the present disclosure may arrange one or more components of the system 100 differently (e.g., one or more of the imaging device 132, the robot 136, and/or the navigation system 156 may comprise one or more of the components shown in FIG. 1 as being part of the computing device 102). Still further, systems according to other embodiments of the present disclosure may comprise two or more of any of the components described herein, including, for example, the imaging device 132, the robot 136, and/or the database 160.

The computing device 102 comprises at least one processor 104, at least one communication interface 108, at least one user interface 112, and at least one memory 116. A computing device according to other embodiments of the present disclosure may omit one or both of the communication interface(s) 108 and the user interface(s) 112.

The at least one processor 104 of the computing device 102 may be any processor identified or described herein or any similar processor. The at least one processor 104 may be configured to execute instructions 124 stored in the at least one memory 116, which instructions 124 may cause the at least one processor 104 to carry out one or more computing steps utilizing or based on data received, for example, from the imaging device 132, the robot 136, the navigation system 156, the database 160, and/or the cloud 164.

The computing device 102 may also comprise at least one communication interface 108. The at least one communication interface 108 may be used for receiving image data or other information from an external source (such as an imaging device 132, a robot 136, the navigation system 156, the database 160, the cloud 164, and/or a portable storage medium (e.g., a USB drive, a DVD, a CD)), and/or for transmitting instructions, images, or other information from the at least one processor 104 and/or the computing device 102 more generally to an external system or device (e.g., another computing device 102, the imaging device 132, the robot 136, the navigation system 156, the database 160, the cloud 164, and/or a portable storage medium (e.g., a USB drive, a DVD, a CD)). The at least one communication interface 108 may comprise one or more wired interfaces (e.g., a USB port, an ethernet port, a Firewire port) and/or one or more wireless interfaces (configured, for example, to transmit information via one or more wireless communication protocols such as 802.11a/b/g/n, Bluetooth, Bluetooth low energy, NFC, ZigBee, and so forth). In some embodiments, the at least one communication interface 108 may be useful for enabling the computing device 102 to communicate with one or more other processors 104 or computing devices 102, whether to reduce the time needed to accomplish a computing-intensive task or for any other reason.

The at least one user interface 112 may be or comprise a keyboard, mouse, trackball, monitor, television, touchscreen, button, joystick, switch, lever, headset, eyewear, wearable device, and/or any other device for receiving information from a user and/or for providing information to a user of the computing device 102. The at least one user interface 112 may be used, for example, to receive a user selection or other user input in connection with any step of any method described herein; to receive a user selection or other user input regarding one or more configurable settings of the computing device 102, the imaging device 132, the robot 136, and/or of another component of the system 100; to receive a user selection or other user input regarding how and/or where to store and/or transfer data received, modified, and/or generated by the computing device 102; and/or to display information (e.g., text, images) and/or play a sound to a user based on data received, modified, and/or generated by the computing device 102. Notwithstanding the inclusion of the at least one user interface 112 in the system 100, the system 100 may automatically (e.g., without any input via the at least one user interface 112 or otherwise) carry out one or more, or all, of the steps of any method described herein.

Although the at least one user interface 112 is shown as part of the computing device 102, in some embodiments, the computing device 102 may utilize a user interface 112 that is housed separately from one or more remaining components of the computing device 102. In some embodiments, the user interface 112 may be located proximate one or more other components of the computing device 102, while in other embodiments, the user interface 112 may be located remotely from one or more other components of the computer device 102.

The at least one memory 116 may be or comprise RAM, DRAM, SDRAM, other solid-state memory, any memory described herein, or any other tangible non-transitory memory for storing computer-readable data and/or instructions. The at least one memory 116 may store information or data useful for completing, for example, any step of the methods 300, 400, 500, and/or 600 described herein. The at least one memory 116 may store, for example, information about one or more coordinate systems 122 (e.g., information about a robotic coordinate system or space corresponding to the robot 136, information about a navigation coordinate system or space, information about a patient coordinate system or space); instructions 124 for execution by the at least one processor 104, for example to cause the at least one processor 104 to carry out one or more of the steps of the methods 300, 400, 500, and/or 600; and/or one or more algorithms 128 for use by the processor in carrying out any calculations necessary to complete one or more of the steps of the methods 300, 400, 500, and/or 600 (e.g., to determine a pose of a target, and so forth), or for any other calculations. Such instructions 124 and/or algorithms 128 may, in some embodiments, be organized into one or more applications, modules, packages, layers, or engines, and may cause the at least one processor 104 to manipulate data stored in the at least one memory 116 and/or received from or via another component of the system 100. The at least one memory 116 may also store one or more surgical plans 120.

The imaging device 132 may be operable to image anatomical feature(s) (e.g., a bone, veins, tissue, etc.) and/or other aspects of patient anatomy, a target, a tracking marker, and/or any surgical instruments or tools within the field of view of the imaging device 132, to yield image data (e.g., image data depicting or corresponding to a bone, veins, tissue, implants, tools, etc.). The imaging device 132 may be capable of taking a two-dimensional ("2D") image or a three-dimensional ("3D") image to yield the image data. "Image data" as used herein refers to the data generated or captured by an imaging device 132, including in a machine-readable form, a graphical/visual form, and in any other form. In various examples, the image data may comprise data corresponding to an anatomical feature of a patient, or to a portion thereof. The imaging device 132 may be or comprise, for example, an ultrasound scanner (which may comprise, for example, a physically separate transducer and receiver, or a single ultrasound transceiver), a radar system (which may comprise, for example, a transmitter, a receiver, a processor, and one or more antennae), an O-arm, a C-arm, a G-arm, or any other device utilizing X-ray-based imaging (e.g., a fluoroscope, a CT scanner, or other X-ray machine), a magnetic resonance imaging (MM) scanner, an optical coherence tomography scanner, an endoscope, a microscope, a thermographic camera (e.g., an infrared camera), a stereoscopic camera, or any other imaging device 132 suitable for obtaining images of an anatomical feature of a patient. The imaging device 132 may also comprise a camera with at least two lenses and image(s) from each lens may be used for forming a 3D image.

In some embodiments, the imaging device 132 may comprise more than one imaging device 132. For example, a first imaging device may provide first image data and/or a first image, and a second imaging device may provide second image data and/or a second image. In still other embodiments, the same imaging device may be used to provide both the first image data and the second image data, and/or any other image data described herein. In another example, two imaging devices 132 may be supported on a single robotic arm 148 to capture images from different angles at the same time (which images may be used to form a 3D image). The imaging device 132 may be operable to generate a stream of image data. For example, the imaging device 132 may be configured to operate with an open shutter, or with a shutter that continuously alternates between open and shut so as to capture successive images.

The robot 136 may be any surgical robot or surgical robotic system. The robot 136 may be or comprise, for example, the Mazor X™ Stealth Edition robotic guidance system. The robot 136 may comprise a base 140 that supports a robotic arm 148. The robot 136 may comprise one or more robotic arms 148 (e.g., some robots 136 may comprise two robotic arms 148, three robotic arms 148, four robotic arms 148, or another number of robotic arms 148). Each robotic arm 148 may, in some embodiments, assist with a surgical procedure (e.g., by supporting one or more imaging devices 132, one or more tools, and/or one or more instruments) and/or automatically carry out a surgical procedure.

Each robotic arm 148 may have three, four, five, six, or more degrees of freedom.

The robot 136 also comprises one or more sensors 144. The sensor 144 may be a force sensor, configured to detect a force applied on the robotic arm 148 (e.g., whether via an end effector of the robotic arm 148, a tool held by an end effector of the robotic arm 148, or otherwise). The sensor 144 may be an inertial measurement unit sensor, a position sensor, a proximity sensor, a magnetometer, or an accelerometer. In some embodiments, the sensor 144 may be a linear encoder, a rotary encoder, or an incremental encoder. In still other embodiments, the sensor 144 may be an imaging sensor. Other types of sensors may also be used as the sensor 144. The one or more sensors 144 may be positioned, for example, on the robotic arm 148 or elsewhere.

Data from the sensor(s) 144 may be provided to a processor of the robot 136, to the processor 104 of the computing device 102, and/or to the navigation system 156. The data may be used to calculate a pose of the robotic arm 148, of an end effector of the robotic arm 148, and/or of a tool or other device attached to the robotic arm 148 (whether via an end effector or otherwise). The calculation may be based not just on data received from the sensor(s) 144, but also on data or information (such as, for example, physical dimensions) about, for example, the robot 136 or a portion thereof, or any other relevant object, which data or information may be stored, for example, in a memory 116 of a computing device 102 or in any other memory. The data may also be used to detect if a force received by the robotic arm 148 (which may be a force received by a tool supported by the robotic arm 148) exceeds a predetermined threshold.

One or more tracking markers 152 may be fixedly secured to or positioned on the robot 136, whether on the base 140, the robotic arm 148, and/or elsewhere. In some embodiments, one or more tracking markers 152 may additionally or alternatively be affixed to one or more other components of the system 100. In other embodiments, one or more tracking markers 152 may be fixed to a patient (for example, to mark an incision). The tracking markers 152 may be useful for enabling the navigation system 156 to determine and/or track a position of the robot 136 (or any other component to which one or more tracking markers 152 are secured). In some embodiments, one or more tracking markers 152 (or similar tracking markers) may be affixed to a patient undergoing a surgical procedure, so as to enable an imaging device 132, a navigation system 156, or another system or device to track a position of the patient.

The navigation system 156 of the system 100 may provide navigation for a surgeon and/or for the robot 136 during an operation. The navigation system 156 may be any now-known or future-developed navigation system, including, for example, the Medtronic StealthStation™ S8 surgical navigation system. The navigation system 156 may include a camera or other sensor(s) for detecting and/or tracking one or more reference markers, navigated tracking markers, or other targets within an operating room or other room where a surgical procedure takes place. In various embodiments, the navigation system 156 may be used to track a position of the robotic arm 148 (or, more particularly, of one or more tracking markers 152 attached to the robotic arm 148) of each robot 136. The navigation system 156 may be used to track a position of one or more reference frames, markers, or arrays or other structures useful for detection by a camera or other sensor of the navigation system 156. The navigation system 156 may be used, for example, to detect a position of a reference frame mounted to a patient and/or a position of one or more robotic arms 148. The navigation system 156 may include a display for displaying one or more images from an external source (e.g., the computing device 102, the imaging device 132, a database 160, the cloud 164, or another source) or a video stream from the camera or other sensor of the navigation system 156. In some embodiments, the system 100 may operate without the use of the navigation system 156.

The database 160 may store information that correlates one coordinate system 122 to another (e.g., one or more robotic coordinate systems to a patient coordinate system and/or to a navigation coordinate system). The database 160 may additionally or alternatively store, for example, information about or corresponding to one or more characteristics of the tracking markers 152; one or more surgical plans 120 (including, for example, pose information about a target and/or image information about a patient's anatomy at and/or proximate the surgical site, for use by the robot 136, the navigation system 156, and/or a user of the computing device 102 or of the system 100); one or more images useful in connection with a surgery to be completed by or with the assistance of one or more other components of the system 100; and/or any other useful information. The database 160 may be configured to provide any such information to the computing device 102 or to any other device of the system 100 or external to the system 100, whether directly or via the cloud 164. In some embodiments, the database 160 may be or comprise part of a hospital image storage system, such as a picture archiving and communication system (PACS), a health information system (HIS), and/or another system for collecting, storing, managing, and/or transmitting electronic medical records including image data.

The cloud 164 may be or represent the Internet or any other wide area network. The computing device 102 may be connected to the cloud 164 via the communication interface 108, using a wired connection, a wireless connection, or both. In some embodiments, the computing device 102 may communicate with the database 160 and/or an external device (e.g., a computing device) via the cloud 164.

Figure 2A:
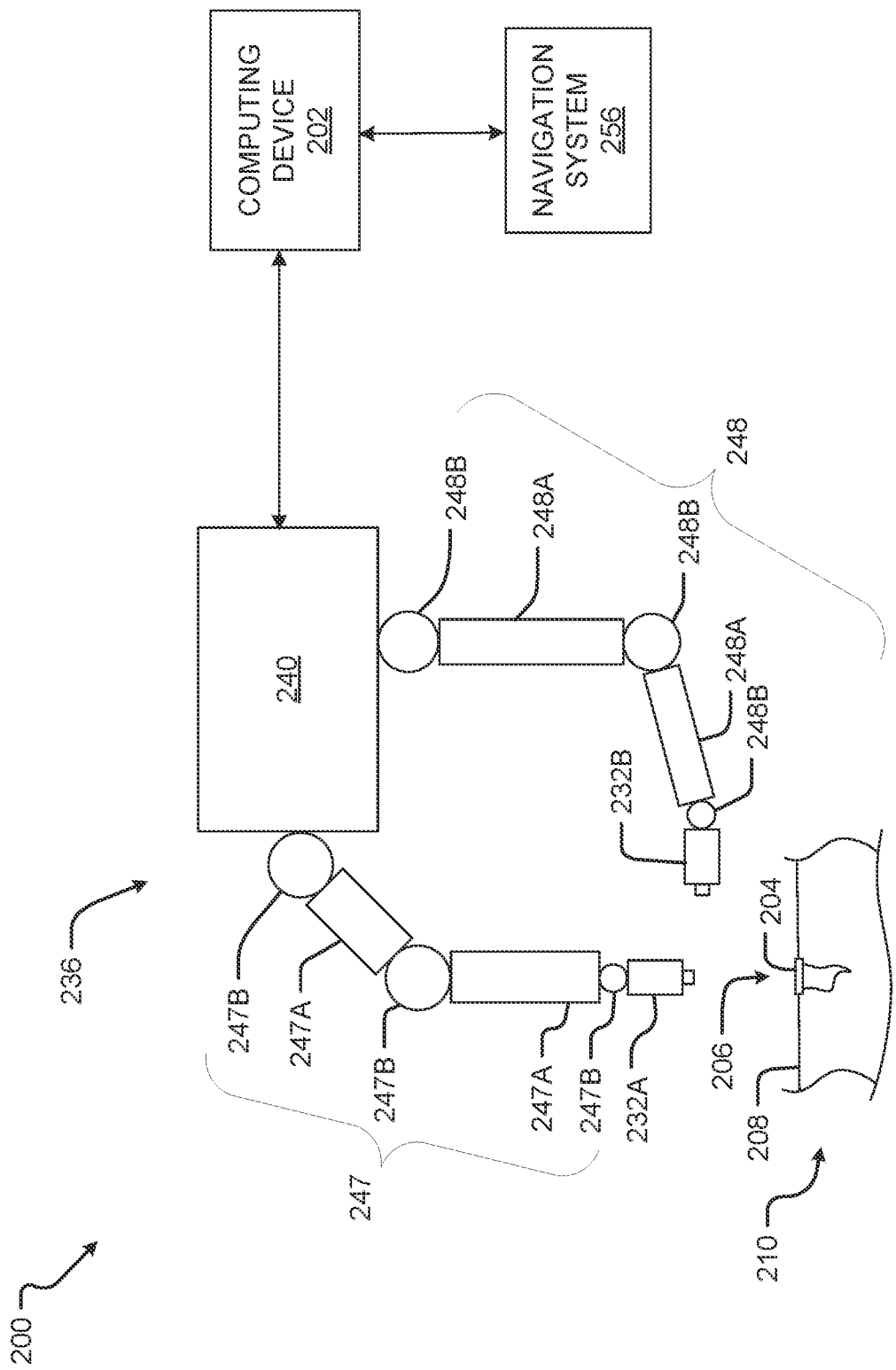
FIG. 2A is a diagram of a system according to at least one embodiment of the present disclosure.
Figure 2B:
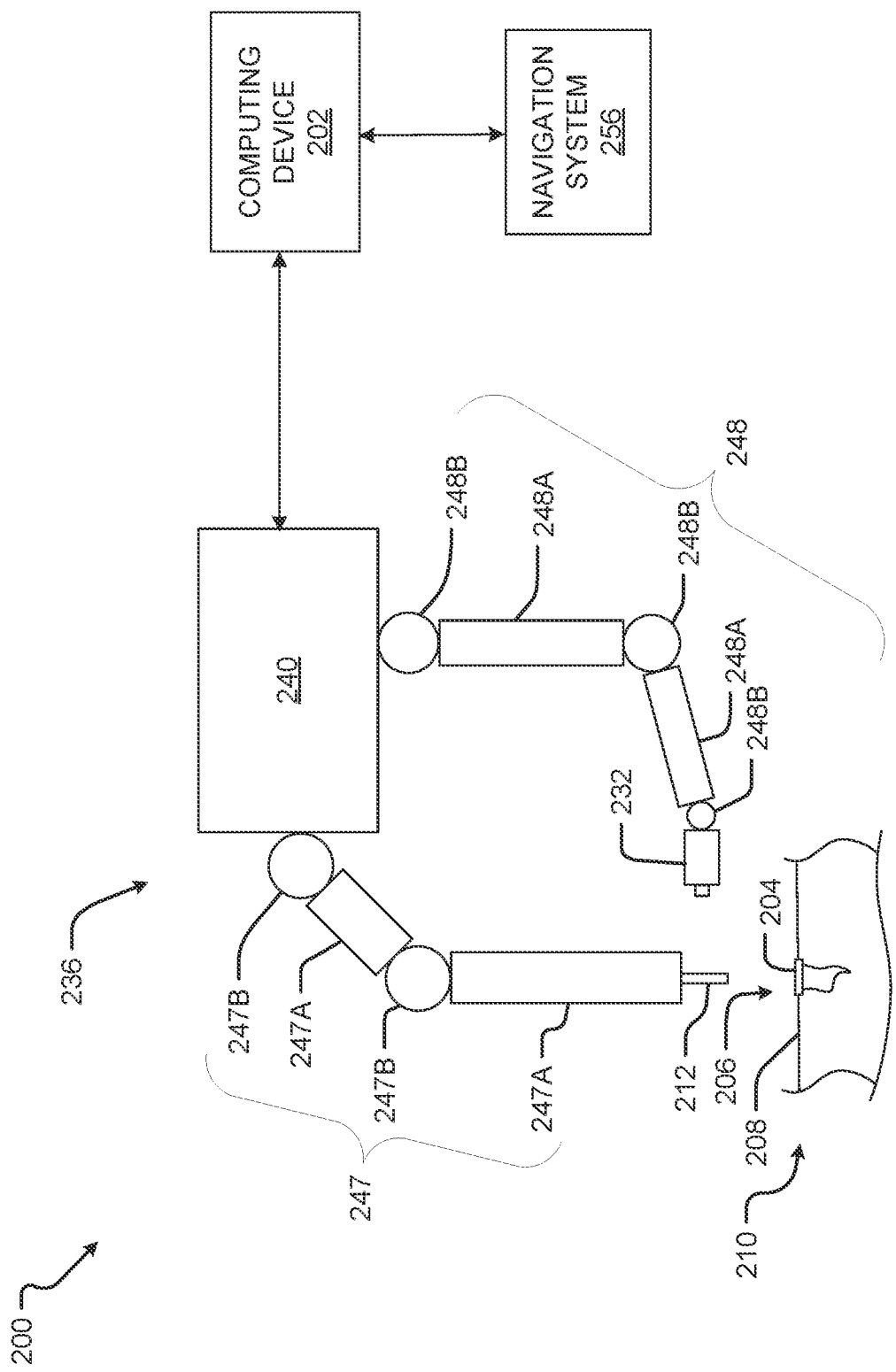
FIG. 2B is a diagram of a system according to at least one embodiment of the present disclosure.

Turning to FIGS. 2A and 2B, a block diagram of two different embodiments of a system 200 in accordance to at least one embodiment of the present disclosure is shown. The system 200 in either FIG. 2A or 2B includes a computing device 202 (which may be the same as or similar to the computing device 102 described above), a navigation system 256 (which may be the same as or similar to the navigation system 156 described above), and a robot 236 (which may be the same as or similar to the robot 136 described above). Systems according to other embodiments of the present disclosure may comprise more or fewer components than the system 200. For example, the system 200 may not include the navigation system 256.

As illustrated, the robot 214 includes a first robotic arm 247 (which may comprise one or more members 247A connected by one or more joints 247B) and a second robotic arm 248 (which may comprise one or more members 248A connected by one or more joints 248B), each extending from a base 240. In other embodiments, the robot 236 may include one robotic arm or two or more robotic arms. The base 240 may be stationary or movable. The first robotic arm 247 and the second robotic arm 248 operate in a shared or common coordinate space. By operating in the common coordinate space, the first robotic arm 247 and the second robotic arm 248 avoid colliding with each other during use, as a position of each robotic arm 247, 248 is known to each other. In other words, because each of the first robotic arm 247 and the second robotic arm 248 have a known position in the same common coordinate space, collision can be automatically avoided as a controller of the first robotic arm 247 and of the second robotic arm 248 is aware of a position of both of the robotic arms.

In some embodiments, one or more imaging devices 232 (which may be the same as or similar to the imaging device 132 described above) may be disposed or supported on an end of the first robotic arm 247 and/or the second robotic arm 248. In other embodiments, the imaging devices 232 may be disposed or secured to any portion of the first robotic arm 247 and/or the second robotic arm 248. In other embodiments, one or more tools 202 or instruments may be disposed on an end of each of the first robotic arm 247 and the second robotic arm 248, though the tools or instruments may be disposed on any portion of the first robotic arm 247 and/or the second robotic arm 248. In further embodiments, both a tool 212 and an imaging device 232 may be supported on the same robotic arm 247. In still other embodiments, any one or more tool(s), instrument(s), or imaging device(s) may be supported by, secured to, or disposed on a robotic arm. The first robotic arm 247 and/or the second arm 248 is operable to execute one or more planned movements and/or procedures autonomously and/or based on input from a surgeon or user.

As illustrated in FIG. 2A, a first imaging device 232A is supported by the first robotic arm 247 and a second imaging device 232B is supported by the second robotic arm 248. The imaging devices 232A and 232B may be the same as or similar to the imaging device 132 or any other imaging devices described herein. As will be described in more detail below, the first imaging device 232A and the second imaging device 232B may each obtain one or more images of a target 204. In the illustrated example, the target 204 is a port for an incision 206 formed on a surface 208 of a patient 210. In other embodiments, the target 204 may be an object, an incision, an anatomical element, a tool, an instrument, a robotic arm, any component of the system, or the like. The target 204 may be external to a patient or internal to a patient. In some embodiments, the one or more images combined with pose information of each of the first imaging device 232A and the second imaging device 232B may be used to determine a pose of the target 204. In other embodiments, the one or more images may be used to calculate a volume of the target 204. In further embodiments, the one or more images may be used to generate a 3D model of the target 204.

Additional image(s) of the target 204 may be taken from different angles by either the first imaging device 232A or the second imaging device 232B, or both, to determine a boundary of the target 204 and/or to update a pose of the object or the target 204 (whether to update the pose because the target 204 has moved or to increase an accuracy of the determined pose).

In some embodiments, the first imaging device 232A and/or the second imaging device 232B may be used to track movement of the target 204, as will be described further below.

As illustrated in FIG. 2B, a tool 212 is supported by the first robotic arm 247 and an imaging device 232 is supported by the second robotic arm 248. The imaging device 232 may be the same as or similar to the imaging device 132 or any other imaging device described herein. The tool 212 may be used to perform an action or a procedure on the patient 210, whether based on instructions from a surgeon and/or pursuant to a surgical plan such as the surgical plan 120. For example, the tool 212 may be used to form the incision 206. During use, the imaging device 232 may be used to track the tool 212. In at least one embodiment, the imaging device 232 may track the tool 212 as the tool 212 forms the incision 206. The imaging device 232 may then track the incision 206 (or a port of the incision 206), whether to confirm a pose of the incision 206 or detect movement of the incision 206. By tracking the incision 206, pose information of the incision 206 may be used to control the first robotic arm to re-insert the tool 212 or to insert a different tool into the incision 206.

The imaging device 232 may also be used to track and detect movement of the target 204. A path of the tool 212 can be updated or adjusted, or the first robotic arm 247 may be controlled to compensate (e.g., apply a reactive force) when movement is detected. For example, the imaging device 232 may track an incision for movement. When movement of the incision is detected, a path of the tool 212 (that is outside of the incision) may be shifted to reach a position of the incision after movement.

Figure 3:
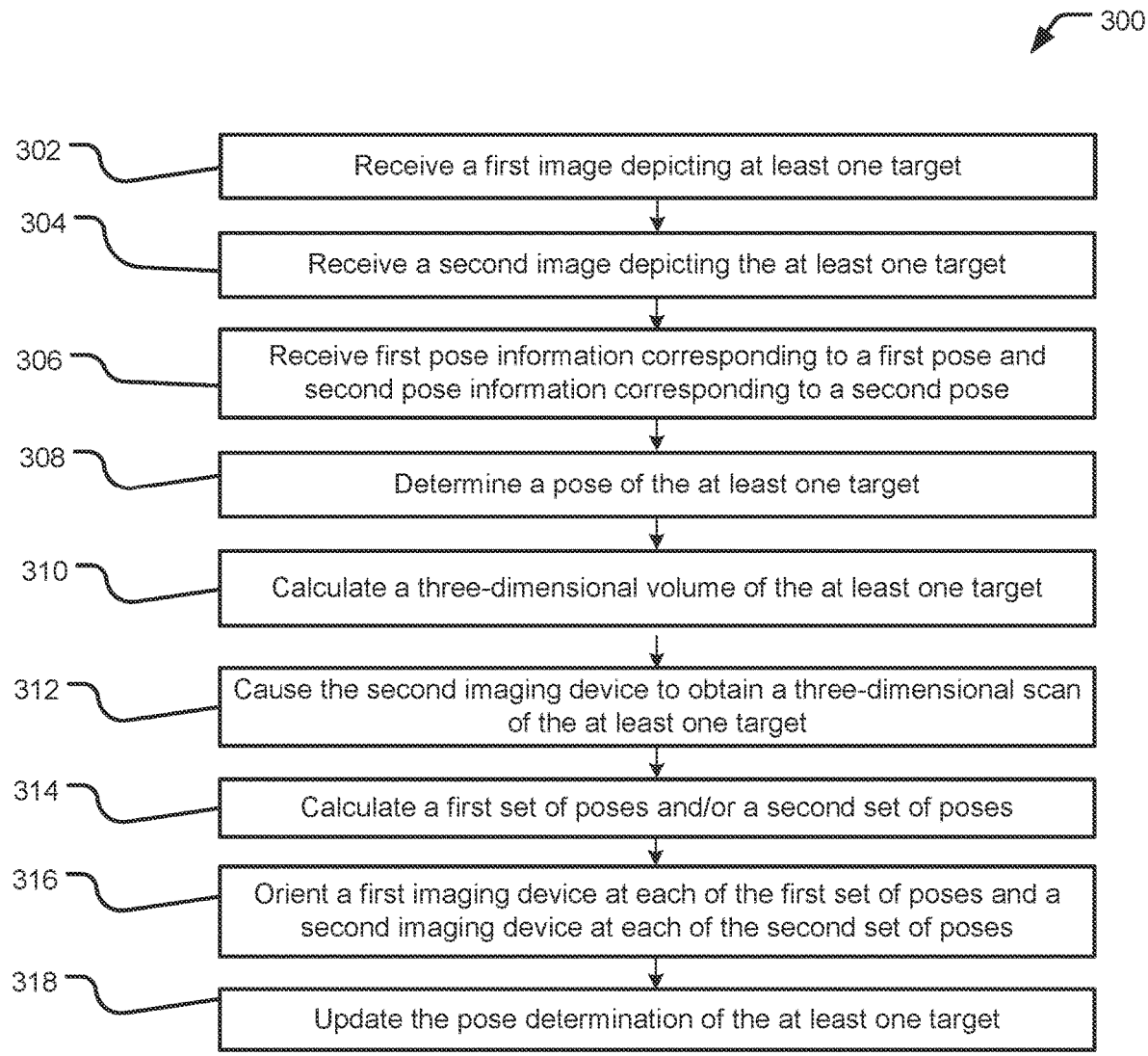
FIG. 3 is a flowchart of a method according to at least one embodiment of the present disclosure.

Turning now to FIG. 3, a method 300 of determining and tracking a pose of a target may be carried out or otherwise performed, for example, by at least one processor. The at least one processor may be the same as or similar to the processor(s) 104 of the computing device 102 or 202 described above. The at least one processor may be part of a robot (such as a robot 136 or 236) or part of a navigation system (such as a navigation system 156 or 256). A processor other than any processor described herein may also be used to execute the method 300. The at least one processor may perform the method 300 by executing instructions stored in a memory, such as the instructions 124 of the memory 116. The instructions may correspond to one or more steps of the method 300 described below. The instructions may cause the processor to execute one or more algorithms, such as the algorithms 128. For example, one or more such algorithms 128 may be used to determine a pose of a target, calculate a volume of a target, calculate a first set of poses and a second set of poses, and/or update a pose determination of a target.

The method 300 comprises receiving a first image from a first imaging device (step 302). The first imaging device may be the same as or similar to the imaging device 132, 232A, which may be any imaging device such as a camera, X-ray based imaging device, a stereoscopic camera, or ultrasound imaging device. The first imaging device may be oriented by a first robotic arm such as the robotic arm 148 or 247.

The image may comprise one or more 2D images, one or more 3D images, or a combination of one or more 2D images and one or more 3D images. In other embodiments, the image may be received via a user interface such as the user interface 112 and/or via a communication interface such as the communication interface 108 of a computing device such as the computing device 102 or 202, and may be stored in a memory such as the memory 116. The image may also be generated by and/or uploaded to any other component of the system 100 or 200. In some embodiments, the image may be indirectly received via any other component of the system or a node of a network to which the system is connected.

The first image may depict at least one target. The at least one target may be a reference marker, a marking on a patient anatomy, an anatomical element, an incision, a tool, an instrument, an implant, or any other object. The at least one target may also have been inserted into a patient anatomy (whether by a robotic arm or a user) and left in place to be tracked. For example, a port may be inserted into an incision, then the port may be tracked.

The first image may be processed using an algorithm such as the algorithm 128 to process the image and identify the at least one target in the first image. In some embodiments, feature recognition may be used to identify a feature of the at least one target. For example, a contour of a screw, port, tool, edge, instrument, or anatomical element may be identified in the first image. In other embodiments, an image processing algorithm may be based on artificial intelligence or machine learning. In such embodiments, a plurality of training images may be provided to the processor, and each training image may be annotated to include identifying information about a target in the image. The processor, executing instructions stored in memory such as the memory 116 or in another memory, may analyze the images using a machine-learning algorithm and, based on the analysis, generate one or more image processing algorithms for identifying target(s) in an image. Such image processing algorithms may then be applied to the image received in step 302, as described above.

The method 300 also comprises receiving a second image from a second imaging device (step 304). The step 304 may be the same as or similar to the step 302 of the method 300 described above with respect to receiving the second image.

Additionally, the second imaging device may be the same as or similar to the imaging device 132, 232B. In some embodiments, the second imaging device comprises one, two, or more than two stereoscopic cameras configured to generate 3D images. In other embodiments, the second imaging device is a camera, X-ray-based imaging device, or an ultrasound-based imaging device. The second imaging device may be the same as the first imaging device or may be a different imaging device. The second imaging device may also be a different type of imaging device as the first imaging device, or the same type of imaging device as the first imaging device. The second image may depict the at least one target. The second image may be taken from a different angle than the first image. In other words, the second imaging device may be at a different pose than the first imaging device when each of the second image and the first image is obtained, respectively.

The second imaging device may be oriented by a second robotic arm such as the robotic arm 148 or 248. The first robotic arm and the second robotic arm operate in a shared coordinate space. As previously described, by operating in the common coordinate space, the first robotic arm and the second robotic arm may be controlled to avoid colliding with each other during use, as a position of each robotic arm is known to the controller thereof. In other words, because each of the first robotic arm and the second robotic arm have a known position in the same common coordinate space, the arms can be automatically controlled to avoid collision therebetween.

The method 300 also comprises receiving first pose information corresponding to a first pose of the first imaging device in the coordinate space and second pose information corresponding to a second pose of the second imaging device in the coordinate space (step 306). In some embodiments, the first pose information and the second pose information may be received from a sensor such as the sensor 144 disposed on each of the first robotic arm and the second robotic arm. The sensor may be an encoder. In other embodiments, a navigation system such as the navigation system 156 or 256 may be used to obtain or validate the first pose information and the second pose information. For example, tracking markers such as the tracking markers 152 may be disposed on each of the first robotic arm and the second robotic arm, and the tracking markers 152 may be tracked by a camera of the navigation system. The first pose information and the second pose information may then be determined by the navigation system.

Each of the first pose and the second pose includes the position and orientation of the first imaging device and the second imaging device, respectively. The first pose and the second pose may correspond to a pose of the first imaging device and the second imaging device, respectively, at the moment when the first image and the second image were obtained. In embodiments where sensor data is used to determine the first pose and the second pose, a sensor (such as the sensor 144) may be disposed on the first imaging device, the second imaging device, the first robotic arm, and/or the second robotic arm. When the sensor is disposed on the first robotic arm and the second robotic arm, the sensor data may correlate to a position of a segment, joint, or any portion of the first robotic arm and/or the second robotic arm. The first pose of the first imaging device and the second pose of the second imaging device may then be determined from the position of the portion of the first robotic arm and the second robotic arm, respectively. For example, based on dimensions of the robot (which may be received in a surgical plan such as the surgical plan 120, by user input via a user interface such as the user interface 112, or which may be measured), an offset from the portion of the robotic arm at which the sensor is positioned to the imaging device may be determined and applied to the sensor data. The pose of the imaging device can then be determined based on the applied offset.

The method 300 also comprises determining a pose of the at least one target in the coordinate space (step 308). Determining the pose may be based on the first image obtained in step 302, the second image obtained in step 304, the first pose obtained in step 306, and the second pose obtained in step 306. More specifically, based on the identified target in the first image and the corresponding first pose and the identified target in the second image and the corresponding second pose, the pose of the at least one target may be determined. The pose of the at least one target may be mapped to the common coordinate space of the first robotic arm and the second robotic arm such that the target may be referenced in the common coordinate space. By determining the pose of the at least one target, the at least one target can be tracked and/or the first robotic arm and/or the second robotic arm can be controlled to perform a procedure involving the at least one target and/or to avoid colliding with the at least one target.

The method 300 also comprises calculating a volume of the at least one target (step 310). An algorithm such as the algorithm 128 may be used to calculate the volume. Calculating the volume may be based on the first image obtained in step 302, the second image obtained in step 304, the first pose obtained in step 306, and the second pose obtained in step 306. Similarly to step 308, based on the identified target in the first image and the corresponding first pose and the identified target in the second image and the corresponding second pose, the volume of the target may be calculated. In some embodiments, the volume may be calculated, for example, by using the first image and the corresponding first pose and the second image and the corresponding pose to identify each surface that define the target, as well as the pose of those surfaces. The volume may then be calculated enclosed by those surfaces. Additional images may be taken, such as described in steps 314 and 316, to calculate the volume and/or to increase an accuracy of the calculated volume.

The method 300 also comprises causing the second imaging device to obtain a 3D scan of the at least one target (step 312). The 3D scan may include one or more images from multiple angles. In some embodiments, the second robotic arm may automatically change a pose, a position, or an orientation of the second imaging device to obtain more angles to improve an accuracy of the scan. In some embodiments, the second imaging device may be a stereotactic camera configured to obtain multiple images from different perspectives simultaneously to form the 3D scan. In other embodiments, causing the second imaging device to obtain the 3D scan may include calculating a plurality of poses and causing the second robotic arm to orient the second imaging device at each pose of the plurality of poses. The second imaging device may obtain one or more images at each pose to obtain the 3D scan. The 3D scan may be used to generate a 3D model of the at least one target. The 3D scan may also be used to improve an accuracy of the determined pose of the at least one target.

The method 300 also comprises calculating a first set of poses and/or a second set of poses (step 314). An algorithm such as the algorithm 128 may be used to calculate the first set of poses and/or the second set of poses. In some embodiments, both a first set of poses and a second set of poses are calculated. In other embodiments only one of the first set of poses or the second set of poses may be calculated.

In some embodiments, the first set of poses and the second set of poses may be calculated based on desired additional information or missing information of the at least one target. For example, it may be desirable to determine a boundary or dimensions of a feature of the target with which a tool may collide (e.g., a protrusion). In another example, additional images for the 3D scan obtained in step 312 may be desired. In other embodiments, the first set of poses and/or the second set of poses may be calculated to improve an accuracy of the pose determined in step 308. For example, additional images may provide more information from which the pose of the at least one target may be confirmed or adjusted. In further embodiments, the first set of poses and/or the second set of poses may be calculated to update a pose of the at least one target. For example, the at least one target may move, thus changing the pose.

In yet other embodiments, an algorithm may be configured to calculate the first set of poses and/or the second set of poses based on input or feedback from a surgeon or user. For example, the surgeon or user may wish to obtain an image of the at least one target from a certain angle or plurality of angles. In another example, the surgeon or user may wish to non-invasively position the first and/or second imaging device, while in other examples the surgeon may wish to invasively position the first and/or second imaging device.

It will be appreciated that the first set of poses and/or the second set of poses may be calculated for any reason.

The method 300 also comprises orienting the first imaging device at each of the first set of poses and the second imaging device at each of the second set of poses (step 316). Instructions such as the instructions 124 may be generated and transmitted to the first robotic arm to cause the first robotic arm to orient the first imaging device at each of the first set of poses and/or to cause the second robotic arm to orient the second imaging device at each of the second set of poses. Instructions may also be communicated to a user via a user interface such as the user interface 112 to guide the user (whether manually or robotically assisted) to orient the first imaging device and/or the second imaging device. The first imaging device may obtain one or more images at each pose to form a first image set and the second imaging device may obtain one or more images at each pose to form a second image set. Each of the first image set and the second image set may depict the at least one target.

The method 300 also comprises updating the pose determination obtained in step 308 of the at least one target (step 318). Updating the pose determination may use one or more images of the first image set and/or the second image set obtained in step 316. Updating the pose determination may include updating the pose of the at least one target in the common coordinate space. In some embodiments, updating the pose may comprise adjusting the calculated pose to more accurately reflect the actual pose of the at least one target. For example, the determined pose from step 308 may be offset from a true pose of the at least one target by a small increment (for example, 1%), whereas the updated pose may be offset by a smaller increment (for example, 0.8%). As such, the updated pose has an offset lower than the offset of the determined pose, thus increasing an accuracy of the determined pose. (Notwithstanding the foregoing example, the true pose of the target may not be known.) In some embodiments, updating the pose may also comprise adjusting the calculated or determined pose of the at least one target after the at least one target has moved.

The present disclosure encompasses embodiments of the method 300 that comprise more or fewer steps than those described above, and/or one or more steps that are different than the steps described above.

Figure 4:
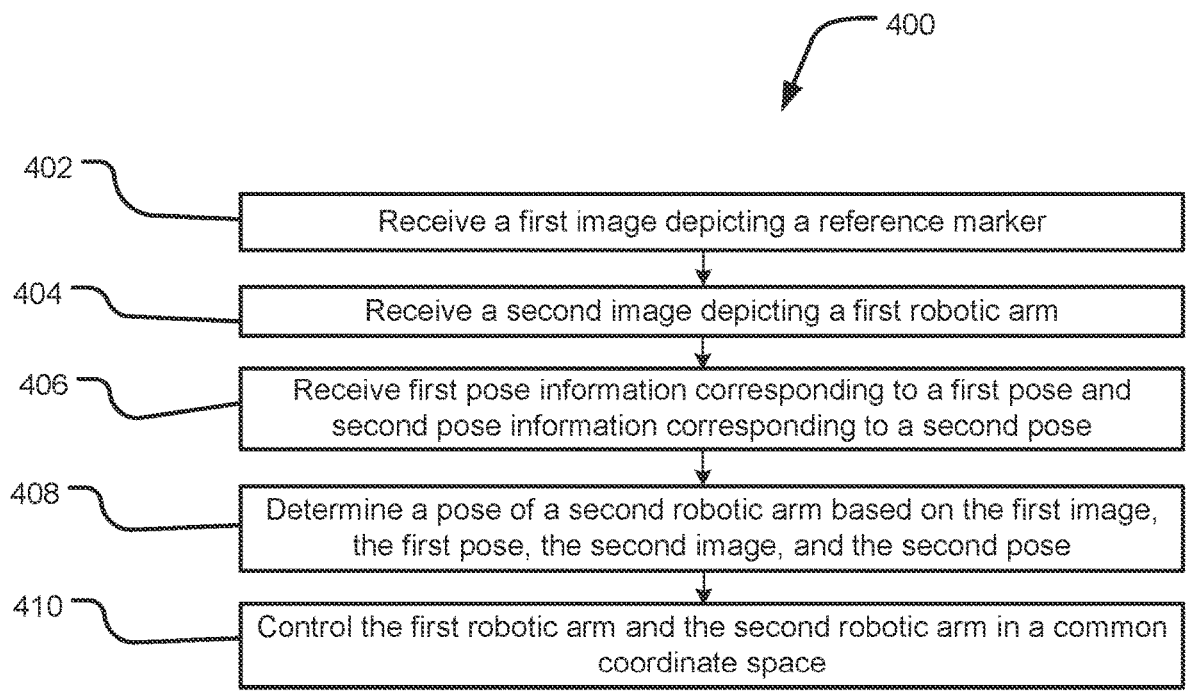
FIG. 4 is a flowchart of a method according to at least one embodiment of the present disclosure.

Turning now to FIG. 4, a method 400 of determining a pose of a robotic arm may be carried out or otherwise performed, for example, by at least one processor. The at least one processor may be the same as or similar to the processor(s) 104 of the computing device 102 or 202 described above. The at least one processor may be part of a robot (such as a robot 136 or 236) or part of a navigation system (such as a navigation system 156 or 256). A processor other than any processor described herein may also be used to execute the method 400. The at least one processor may perform the method 400 by executing instructions stored in a memory, such as the instructions 124 of the memory 116. The instructions may correspond to one or more steps of the method 400 described below. The instructions may cause the processor to execute one or more algorithms, such as the algorithms 128. For example, one or more such algorithms 128 may be used to determine a pose of a robotic arm.

The method 400 comprises receiving a first image from a first imaging device (step 402). The step 402 may be the same as or similar to the step 302 of the method 300 described above. Additionally, the first imaging device may be held by a first robotic arm such as the robotic arm 148 or 247. The first image may depict a tracking marker such as the tracking marker 152.

The method 400 also comprises receiving a second image from a second imaging device (step 404). The step 404 may be the same as or similar to the step 304 of the method 300 described above. Additionally, the second imaging device may be held by a second robotic arm such as the robotic arm 148 or 248. The second image may depict the first robotic arm.

The method 400 also comprises receiving first pose information corresponding to a first pose of the first imaging device and second pose information corresponding to a second pose of the second imaging device (step 406). The step 406 may be the same as or similar to the step 306 of the method 300 described above.

The method 400 also comprises determining a pose of the second robotic arm (step 408). Determining the pose may be based on the first image obtained in step 402, the second image obtained in step 404, the first pose obtained in step 406, and the second pose obtained in step 406. In embodiments where the second robotic arm does not have the same coordinate space as the first robotic arm (and/or one of the first and second coordinate spaces of the first and second robotic arms, respectively, needs to be registered to the other of the first and second coordinate spaces), the pose of the second robotic arm with respect to the first robotic arm (and the first coordinate space) may be determined. More specifically, based on the tracking marker in the first image and the corresponding first pose and the first robotic arm in the second image and the corresponding second pose, the pose of the second arm in the first coordinate space may be determined. The pose of the second arm may be mapped to the first coordinate space. In some embodiments, the second arm may support a tool such as the tool 212, and determining the pose of the second robotic arm may further comprise determining a pose of the tool. The pose of the tool may be determined, for example, in the first coordinate space. Determining the pose of the tool may be based on known dimensions of the robotic arm and/or the tool (whether obtained from a surgical plan such as the surgical plan 120, obtained as input from a user, or measured), which may be used to calculate an offset from the determined pose of the second robotic arm.

In embodiments where the second robotic arm and the first robotic arm are already in the same coordinate space (and thus, the pose of the second robotic arm is known), then a known pose of the robotic arm may be confirmed or updated by the determined pose to increase an accuracy of the known pose of the second robotic arm. The determined pose may also be used to confirm or increase an accuracy of a tool supported by the second robotic arm. Additionally or alternatively, the first image from the step 402 may be used to register a coordinate space of the robotic arms to a coordinate space of a patient or other object to which a tracking marker depicted in the first image is affixed.

The method 400 also comprises controlling the first robotic arm and the second robotic arm in a common coordinate space (step 410). By operating in the common coordinate space, the first robotic arm and the second robotic arm may be controlled to avoid colliding with each other during use, as a position of each robotic arm in the common coordinate space (and thus, relative to the other robotic arm) is known. In other words, because each of the first robotic arm and the second robotic arm have a known position in the same common coordinate space, collision can be automatically avoided by a controller of the first and second robotic arms, which is aware of the positions of both arms.

The present disclosure encompasses embodiments of the method 400 that comprise more or fewer steps than those described above, and/or one or more steps that are different than the steps described above.

Figure 5:
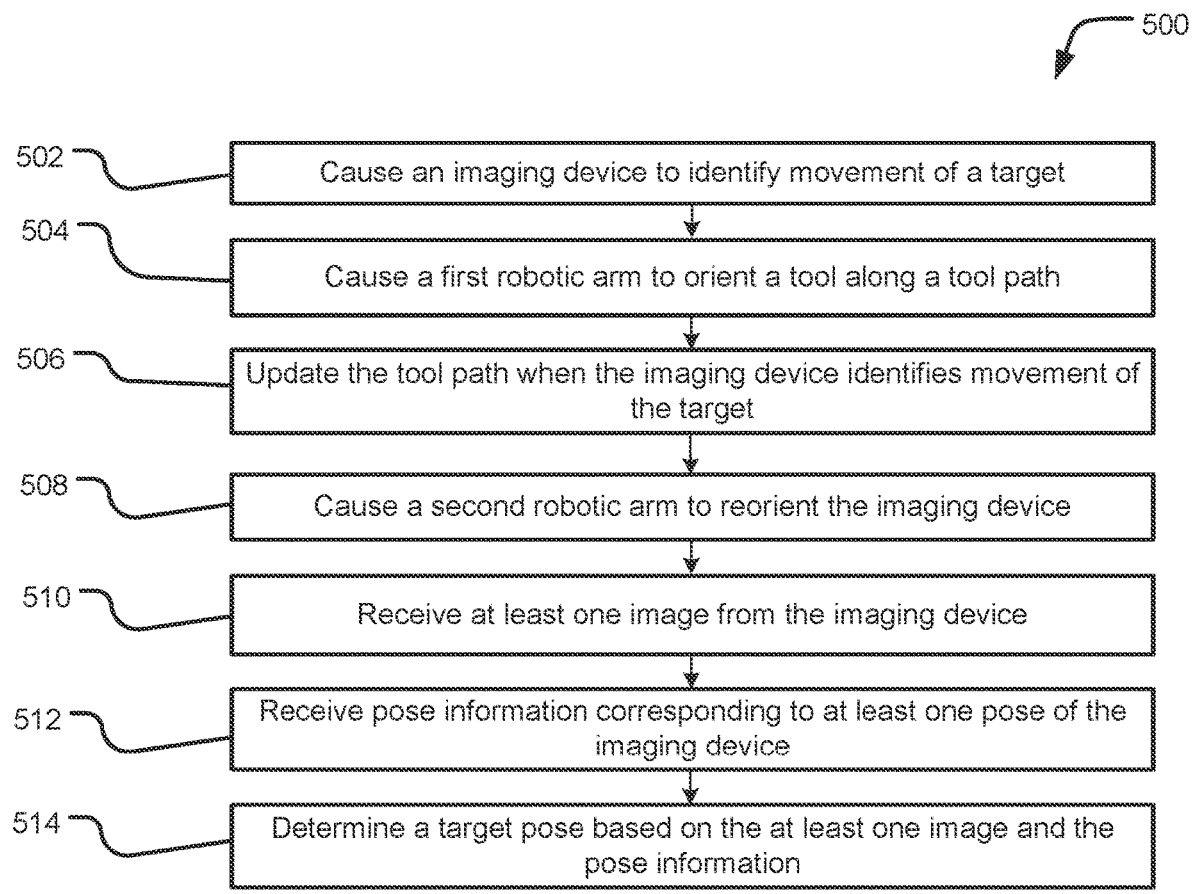
FIG. 5 is a flowchart of a method according to at least one embodiment of the present disclosure.

Turning now to FIG. 5, a method 500 of tracking a target may be carried out or otherwise performed, for example, by at least one processor. The at least one processor may be the same as or similar to the processor(s) 104 of the computing device 102 or 202 described above. The at least one processor may be part of a robot (such as a robot 136 or 236) or part of a navigation system (such as a navigation system 156 or 256). A processor other than any processor described herein may also be used to execute the method 500. The at least one processor may perform the method 500 by executing instructions stored in a memory, such as the instructions 124 of the memory 116. The instructions may correspond to one or more steps of the method 500 described below. The instructions may cause the processor to execute one or more algorithms, such as the algorithms 128. For example, one or more such algorithms 128 may be used to update a tool path and/or determine a pose of the target.

The method 500 comprises using an imaging device to identify movement of a target (step 502). The target may be a reference marker, a marking on a patient anatomy, an anatomical element, an incision, a tool, an instrument, an implant, or any other object. The target may also have been inserted into a patient anatomy (e.g., by a robotic arm or a user) and left in place to be tracked. For example, a port may be inserted into an incision, and then tracked by the imaging device.

In some embodiments, the imaging device may be an ultrasound device or an X-ray device configured to image the target when the target is internal to a patient (e.g., spine screws, a rod, another implant, etc.). In other embodiments, the imaging device may be an optical camera, an infrared camera, or an X-ray configured to image the target when the target is external to the patient (e.g., a reference marker, a port, etc.).

The processor may detect movement in one or more images (or in a stream of images) provided by the imaging device. Similarly, the processor may be configured to identify a target, using feature recognition or otherwise, in an image generated by the imaging device. In other embodiments, the target is identified in a surgical plan such as the surgical plan 120 or input received from a user via the user interface.

The processor may also identify movement in the one or more images (or the stream of images) by determining a pose of the target at a beginning of a surgical procedure and confirming the pose of the target throughout the surgical procedure, as will be described below with respect to steps 510-514.

The method 500 also comprises causing a first robotic arm to orient a tool such as the tool 212 along a tool path (step 504). In some embodiments, the first robotic arm may be caused to orient an instrument or an implant along the tool path, an insertion path, or any other predetermined path. Instructions such as the instructions 124 may be generated and/or transmitted to the first robotic arm to cause the first robotic arm to automatically orient the tool along the tool path. The instructions may also be displayed on a user interface such as the user interface 112 to instruct a user to guide the tool along the tool path (whether manually or robotically assisted). The tool path may be obtained from a surgical plan such as the surgical plan 120, may be input by a user via the user interface, and/or may be calculated prior to or during a surgical procedure.

The method 500 also comprises updating the tool path based on identified movement of the target (step 506). A duration, angle, direction, orientation, and/or a position of the tool along any portion of the path may be updated. In some embodiments, the entire tool path may be recalculated or updated to accommodate movement of the target. In other embodiments, a portion of the tool path may be updated. For example, for a tool that has completed half of the tool path when the movement is detected, the remaining half of the tool path may be updated. In further embodiments, any portion of the tool path may be updated. In some embodiments, the tool path may be updated by adding an offset to the path. For example, if the target has moved 0.5 cm in a particular direction, then the path may be shifted 0.5 cm in the same direction. In other embodiments, where the target is to be avoided, a portion of the tool path near the target may be updated to accommodate the movement of the target.

The method 500 also comprises causing a second robotic arm to reorient the imaging device to keep the target in a field of view of the imaging device (step 508). Instructions such as the instructions 124 may be generated and/or transmitted to the second robotic arm to cause the second robotic arm to automatically reorient the imaging device. The instructions may also be displayed on a user interface such as the user interface 112 to instruct the user to reorient the imaging device (whether manually or robotically assisted). Reorienting the imaging device may include adjusting a pose, a position, or an orientation of the imaging device. The imaging device may be reoriented to keep the entire target or a portion of the target in the field of view. For example, a surgeon may wish to keep a head of a screw in the field of view. Reorienting the imaging device beneficially provides for continuous tracking of the target as a surgical procedure progresses, even where the target moves during the surgical procedure.

The method 500 also comprises receiving at least one image from the imaging device (step 510). The step 510 may be the same as or similar to the step 302 of the method 300 described above. The first image may depict a reference marker affixed to the target. In some embodiments, receiving at least one image may comprise receiving a plurality of images from the imaging device. Each image may be received from the same imaging device or a different imaging device.

The method 500 also comprises receiving pose information corresponding to at least one pose of the imaging device (step 512). The step 512 may be the same as or similar to the step 306 of the method 300 described above. In some embodiments, the pose information corresponds to a plurality of poses of the imaging device.

The method 500 also comprises determining a pose of the target (step 514). Determining the pose of the target may be based on the at least one image (or a plurality of images) obtained in step 510 and the pose information (or plurality of poses) obtained in step 512. Determining the pose of the target may be useful for tracking the target. (In some embodiments, the steps 510-514 may be executed prior to step 502, whether to facilitate execution of the step 502 or otherwise). In some embodiments, steps 510-514 may be repeated throughout a surgical procedure to determine if the pose of the target has changed. Movement of the target may then be detected when the pose of the target has been determined to have changed in subsequent iterations of steps 510-514.

The present disclosure encompasses embodiments of the method 500 that comprise more or fewer steps than those described above, and/or one or more steps that are different than the steps described above.

Figure 6:
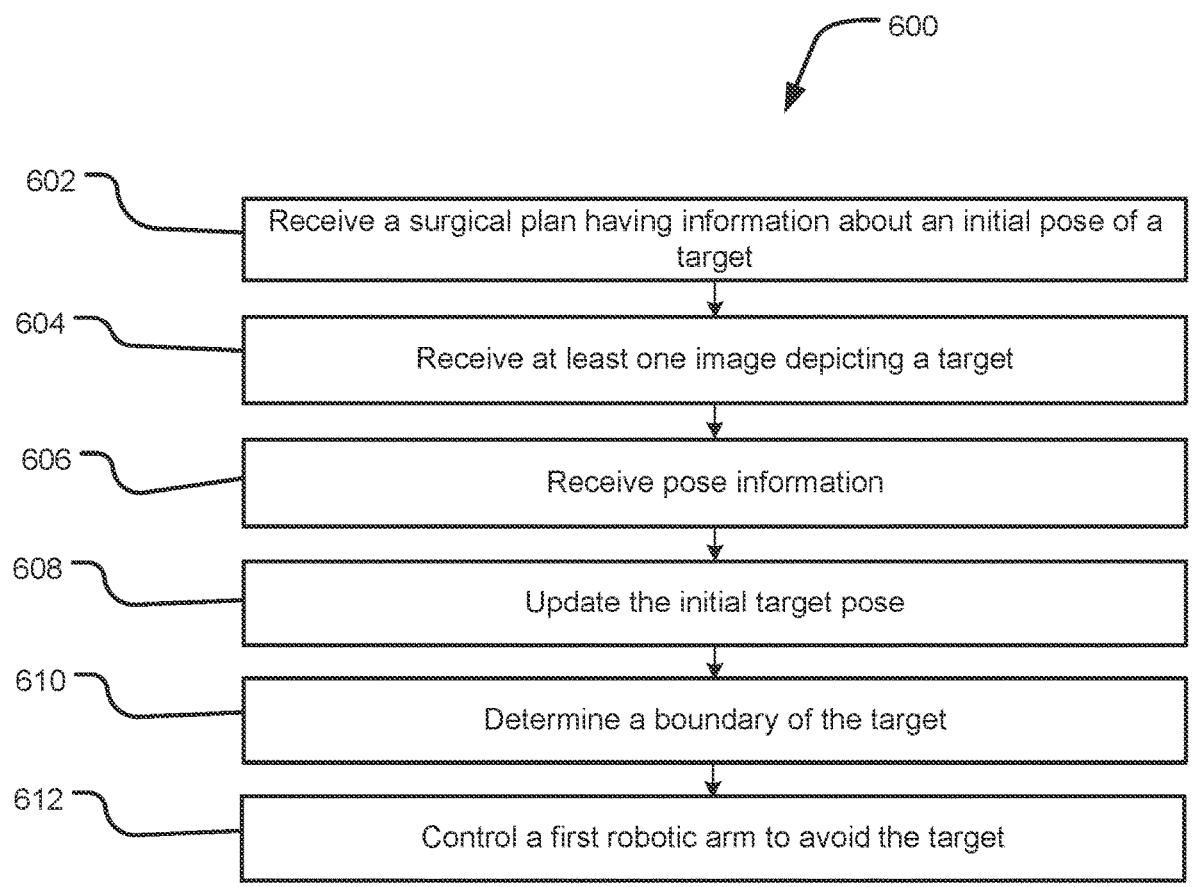
FIG. 6 is a flowchart of a method according to at least one embodiment of the present disclosure.

Turning now to FIG. 6, a method 600 of tracking a target may be carried out or otherwise performed, for example, by at least one processor. The at least one processor may be the same as or similar to the processor(s) 104 of the computing device 102 or 202 described above. The at least one processor may be part of a robot (such as a robot 136 or 236) or part of a navigation system (such as a navigation system 156 or 256). A processor other than any processor described herein may also be used to execute the method 600. The at least one processor may perform the method 600 by executing instructions stored in a memory, such as the instructions 124 of the memory 116. The instructions may correspond to one or more steps of the method 600 described below. The instructions may cause the processor to execute one or more algorithms, such as the algorithms 128. For example, one or more such algorithms 128 may be used to update an initial pose of the target and/or to determine a boundary of a target.

The method 600 comprises receiving a surgical plan having information about an initial pose of a target (step 602). The surgical plan may be received via a user interface such as the user interface 112 and/or a communication interface such as the communication interface 108 of a computing device such as the computing device 102 or 202, and may be stored in a memory such as the memory 106 of the computing device.

The information about the initial pose of the target may correspond to a pose of a target such as the target 204. The target may be a reference marker, a marking on a patient anatomy, an anatomical element, an incision, a tool, an instrument, an implant, or any other object. The target may also have been inserted into a patient anatomy and left in place to be tracked. For example, a port may be inserted into an incision, then the port may be tracked. The pose of the target may be in a common or shared coordinate space that is common to a first robotic arm such as the robotic arm 148 or 247 and a second robotic arm such as the robotic arm 148 or 248. In such embodiments, the first robotic arm may support and orient a tool and the second robotic arm may support and orient an imaging device.

By using the first robotic arm and the second robotic arm in tandem, a processor (e.g., the processor 106) can detect movement of the target in images captured by the imaging device held by the second robotic arm. The processor can then control the first robotic arm based on the detected movement. Further, in some embodiments, an imaging device on the first robotic arm may not have line of sight to the target when operating the tool (for example, a line of sight of a camera positioned on the first robotic arm may be obstructed as the first robotic arm moves to orient a tool). In such circumstances, the second robotic arm may orient the imaging device affixed thereto to maintain a constant line of sight on the target, such that information from the imaging device affixed to the second robotic arm may be used to control the first robotic arm and guide the first robotic arm (including, e.g., a tool held thereby) to the target. Though in some embodiments, images from imaging devices on the first robotic arm and the second robotic arm may improve tracking of the target even when images (depicting the target) from the imaging device affixed to the first robotic arm are available.

The method 600 also comprises receiving at least one image depicting the target (step 604). The step 604 may be the same as or similar to the step 302 of the method 300 described above. However, in some embodiments, the method 600 may comprise receiving at least one image depicting the target from each of an imaging device affixed to a first robotic arm and an imaging device affixed to a second robotic arm. In such embodiments, the step 604 may be the same as or similar to the steps 302 and 304, combined, of the method 300 described above. Each of the at least one image may depict the target.

The method 600 also comprises receiving pose information (step 606). The step 606 may be the same as or similar to the step 306 of the method 300 described above. The pose information may correspond to at least one pose of the imaging device when the at least one image was obtained. Where the at least one image is obtained by two imaging devices, the pose information may correspond to at least one pose of each of the two imaging devices when the at least image was obtained using the respective imaging device.

The method 600 also comprises updating the initial pose of the target (step 608). The step 608 may be the same as or similar to the step 318 of the method 300 described above.

The method 600 also comprises determining a boundary of the target (step 610). Determining the boundary may be based on the at least one image received in step 604 and the pose information received in step 606. More specifically, based on the target identified in each image of the at least one image and the corresponding pose of the imaging device when each image was obtained by the imaging device, the boundary of the target may be determined. The boundary of the target may be mapped to the common coordinate space of the first robotic arm and the second robotic arm such that the boundary of the target may be referenced in the common coordinate space. In some embodiments, the boundary may be determined based on interpolating a surface between different portions of the target determined by the images (e.g., where the at least one image comprises a plurality of images) and the corresponding poses. In other embodiments, the boundary may be determined by performing a scanning motion as described in step 312 of method 300 above.

The method 600 also comprises controlling the first robotic arm to avoid the target (step 612). Instructions such as the instructions 124 may be automatically generated and/or transmitted to the first robotic arm to cause the first robotic arm to avoid the target. The instructions may also be displayed on a user interface such as the user interface 112 to instruct the user to guide a tool to avoid the target (whether manually or robotically assisted). The first robotic arm may be controlled to adjust a tool path of a tool such as the tool 212 to avoid the target. Avoiding the target may be based on the boundary of the target determined in step 610. In other words, the processor may know the boundary of the target in the common coordinate space and can adjust the tool path to avoid the boundary of the target. A safety factor may also be applied by the processor to cause the first robotic arm to avoid the target by a predetermined distance. In some embodiments, a notification may be generated and communicated to a user when an initial tool path may intersect the target. The notification may obtain approval from the user, may obtain input from the user, or may simply alert the user of a change in the tool path due to interference.

The present disclosure encompasses embodiments of the method 600 that comprise more or fewer steps than those described above, and/or one or more steps that are different than the steps described above.

For clarity, the methods described herein may be carried out with a first robotic arm and a second robotic arm operating in a common or shared coordinate space. The methods may also be carried out using more than two robotic arms, with each robotic arm operating in a common or shared coordinate space. The methods may further be carried out using more than two robotic arms and at least two robotic arms may be operating in a common or shared coordinate space, but other robotic arms may be operating in a different coordinate space. Further, any combination or number of tool(s), imaging device(s), and/or instrument(s) may be supported on a robotic arm.

As may be appreciated based on the foregoing disclosure, the present disclosure encompasses methods with fewer than all of the steps identified in FIGS. 3, 4, 5, and 6 (and the corresponding description of the methods 300, 400, 500, and 600), as well as methods that include additional steps beyond those identified in FIGS. 3, 4, 5, and 6 (and the corresponding description of the methods 300, 400, 500, and 600). One or more steps of the methods described herein may be performed in an order other than the order in which they are described herein.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for tracking a pose of at least one target comprising:
   a first robotic arm including a first sensor configured to orient a first imaging device;
   a second robotic arm including a second sensor configured to orient a second imaging device, wherein the first robotic arm and the second robotic arm operate in a shared coordinate space, wherein a first pose of the first robotic arm and a second pose of the second robotic arm in the shared coordinate space is determined based on the first sensor and the second sensor, and wherein the first sensor and the second sensor are position sensors;
   at least one processor; and at least one memory storing instructions for execution by the at least one processor that, when executed, cause the at least one processor to:
receive a first image from the first imaging device, the first image depicting the at least one target;
receive a second image from the second imaging device, the second image depicting the at least one target, wherein at least one of the first robotic arm and the second robotic arm is depicted in at least one of the first image and the second image;
determine the pose of the at least one target in the shared coordinate space based on the first image, the first pose, the second image, and the second pose; and
confirm or update the first pose of the first robotic arm or the second pose of the second robotic arm based on at least one of the first image and the second image.

2. The system of claim 1, wherein the at least one memory stores additional instructions for execution by the at least one processor that, when executed, further cause the at least one processor to:
calculate a three-dimensional volume of the at least one target based on the first image, the second image, the first pose, and the second pose to identify each surface that defines the at least one target and a pose of each surface.

3. The system of claim 1, wherein the first robotic arm is configured to orient a tool in addition to the first imaging device.

4. The system of claim 1, wherein the at least one target is an incision, and wherein the at least one memory stores additional instructions for execution by the at least one processor that, when executed, further cause the at least one processor to:
cause the second imaging device to track the incision formed on a patient.

5. The system of claim 1, wherein the first robotic arm is configured to orient a tool, and wherein the at least one memory stores additional instructions for execution by the at least one processor that, when executed, further cause the at least one processor to:
update a path of the first robotic arm when the second imaging device detects movement of the at least one target.

6. The system of claim 1, wherein the at least one memory stores additional instructions for execution by the at least one processor that, when executed, further cause the at least one processor to:
cause the second imaging device to obtain a three-dimensional scan of the at least one target.

7. The system of claim 6, wherein causing the second imaging device to obtain the three-dimensional scan includes calculating a plurality of poses to obtain the three-dimensional scan and causing the second robotic arm to orient the second imaging device at each pose of the plurality of poses.

8. The system of claim 1, wherein the second imaging device comprises a pair of stereoscopic cameras configured to generate three-dimensional images.

9. The system of claim 1, wherein the at least one memory stores additional instructions for execution by the at least one processor that, when executed, further cause the at least one processor to:
calculate a first set of poses for the first imaging device and a second set of poses for the second imaging device;
cause the first robotic arm to orient the first imaging device at each of the first set of poses to yield a first set of images and the second robotic arm to orient the second imaging device at each of the second set of poses to yield a second set of images, each of the first set of images and the second set of images depicting the at least one target; and
update the pose determination of the at least one target based on the first set of images, the first set of poses, the second set of images, and the second set of poses.

10. The system of claim 1, wherein the at least one memory stores additional instructions for execution by the at least one processor that, when executed, further cause the at least one processor to:
control the first robotic arm and the second robotic arm in the shared coordinate space to avoid a collision between the first robotic arm and the second robotic arm.

11. A system for determining a pose of a robotic arm comprising:
a first robotic arm including a first sensor;
a first imaging device and a second imaging device secured to the first robotic arm;
a reference marker disposed on the first robotic arm,
wherein a first pose of the first robotic arm is determined based on the first sensor, and wherein the first sensor is a position sensor;
at least one processor; and
at least one memory storing instructions for execution by the at least one processor that, when executed, cause the at least one processor to:
receive a first image from the first imaging device, the first image depicting the reference marker; and
receive a second image from the second imaging device, wherein the first imaging device captures the first image from a first angle and the second imaging device captures the second image at a same time from a second angle different from the first angle.

12. The system of claim 11, wherein the at least one memory stores additional instructions for execution by the at least one processor that, when executed, further cause the at least one processor to:
generate a three-dimensional (3D) image from the first image and the second image.

13. The system of claim 11, wherein the at least one memory stores additional instructions for execution by the at least one processor that, when executed, further cause the at least one processor to:
cause the second imaging device to obtain a three-dimensional scan of at least one target.

14. The system of claim 13, wherein the first robotic arm is configured to orient a tool.

15. The system of claim 11, wherein the at least one memory stores additional instructions for execution by the at least one processor that, when executed, further cause the at least one processor to:
generate a three-dimensional image of at least one target using the first imaging device and the second imaging device.

16. A system for tracking a target comprising:
a first robotic arm including a first sensor configured to support and operate a tool;
a second robotic arm including a second sensor, wherein the first robotic arm and the second robotic arm are controllable in a common coordinate space, wherein a first pose of the first robotic arm and a second pose of the second robotic arm in the common coordinate space are determined based on the first sensor and the second sensor, and wherein the first sensor and the second sensor are position sensors;

an imaging device secured to the second robotic arm;

at least one processor; and at least one memory storing instructions for execution by the at least one processor that, when executed, cause the at least one processor to:

receive a surgical plan having information about an initial pose of the target;

receive at least one image from the imaging device, the at least one image depicting the target and at least one of the first robotic arm and the second robotic arm;

update the initial pose of the target based on the at least one image to yield an updated pose of the target; and confirm or update at least one of the first pose of the first robotic arm and the second pose of the second robotic arm based on the at least one image.

17. The system of claim 16, wherein the at least one memory stores additional instructions for execution by the at least one processor that, when executed, further cause the at least one processor to:

determine a boundary of the target based on the at least one image.

18. The system of claim 16, wherein the at least one memory stores additional instructions for execution by the at least one processor that, when executed, further cause the at least one processor to:

cause the imaging device to identify movement of the target;

cause the first robotic arm to move the tool along a path; and update the path when the imaging device identifies movement of the target.

19. The system of claim 16, wherein the at least one memory stores additional instructions for execution by the at least one processor that, when executed, further cause the at least one processor to:

control the first robotic arm to avoid the target.

20. The system of claim 16, wherein the imaging device comprises a pair of stereoscopic cameras configured to generate three-dimensional images.

* * * * *